United States Patent
Vashisht et al.

(10) Patent No.: US 12,363,145 B1
(45) Date of Patent: *Jul. 15, 2025

(54) RUN-TIME CONFIGURABLE CYBERSECURITY SYSTEM

(71) Applicant: Musarubra US LLC, Plano, TX (US)

(72) Inventors: Sai Vashisht, Morgan Hill, CA (US); Sagar Khangan, Pune (IN)

(73) Assignee: MUSARUBRA US LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,295

(22) Filed: Dec. 4, 2023

Related U.S. Application Data

(63) Continuation of application No. 17/133,397, filed on Dec. 23, 2020, now Pat. No. 11,838,300.
(Continued)

(51) Int. Cl.
| | | |
|---|---|---|
| *H04L 9/40* | (2022.01) | |
| *G06F 18/214* | (2023.01) | |
| *G06N 20/00* | (2019.01) | |

(52) U.S. Cl.
CPC ........ *H04L 63/1416* (2013.01); *G06F 18/214* (2023.01); *G06N 20/00* (2019.01);
(Continued)

(58) Field of Classification Search
CPC .............. H04L 63/1416; H04L 63/102; H04L 63/1433; H04L 63/1466; G06N 20/00; G06F 18/214
See application file for complete search history.

(56) References Cited

U.S. PATENT DOCUMENTS

| | | |
|---|---|---|
| 6,898,632 B2 | 5/2005 | Gordy et al. |
| 6,941,348 B2 | 9/2005 | Petry et al. |
| (Continued) | | |

FOREIGN PATENT DOCUMENTS

| | | |
|---|---|---|
| GB | 2439806 A | 1/2008 |
| GB | 2490431 B | 3/2014 |
| (Continued) | | |

OTHER PUBLICATIONS

"Mining Specification of Malicious Behavior"—Jha et al, UCSB, Sep. 2007 https://www.cs.ucsb.edu/.about.chris/research/doc/esec07.sub.--mining.pdf-.

(Continued)

*Primary Examiner* — Stephen T Gundry
(74) *Attorney, Agent, or Firm* — Rutan & Tucker, LLP

(57) ABSTRACT

A system for conducting cyberthreat analytics on a submitted object to determine whether the object is malicious is described. The system features a cybersecurity system operating with a cloud platform, which is configured to host resources including cloud processing resources and cloud storage resources. The cybersecurity system is configured to analyze one or more received objects included as part of a submission received from a subscriber after authentication of the subscriber and verification that the subscriber is authorized to perform one or more tasks associated with the submission. The cybersecurity system is configured to operate as a multi-tenant Security-as-a-Service (SaaS) that relies upon the cloud processing resources and the cloud storage resources provided by the cloud platform in performing the cybersecurity operations.

17 Claims, 8 Drawing Sheets

Related U.S. Application Data

(60) Provisional application No. 62/953,422, filed on Dec. 24, 2019.

(52) U.S. Cl.
CPC ........ *H04L 63/102* (2013.01); *H04L 63/1433* (2013.01); *H04L 63/1466* (2013.01)

(56) References Cited

U.S. PATENT DOCUMENTS

| | | | |
|---|---|---|---|
| 7,080,407 | B1 | 7/2006 | Zhao et al. |
| 7,080,408 | B1 | 7/2006 | Pak et al. |
| 7,243,371 | B1 | 7/2007 | Kasper et al. |
| 7,308,716 | B2 | 12/2007 | Danford et al. |
| 7,448,084 | B1 | 11/2008 | Apap et al. |
| 7,458,098 | B2 | 11/2008 | Judge et al. |
| 7,467,408 | B1 | 12/2008 | O'Toole, Jr. |
| 7,496,961 | B2 | 2/2009 | Zimmer et al. |
| 7,519,990 | B1 | 4/2009 | Xie |
| 7,540,025 | B2 | 5/2009 | Tzadikario |
| 7,639,714 | B2 | 12/2009 | Stolfo et al. |
| 7,698,548 | B2 | 4/2010 | Shelest et al. |
| 7,779,463 | B2 | 8/2010 | Stolfo et al. |
| 7,854,007 | B2 | 12/2010 | Sprosts et al. |
| 7,937,387 | B2 | 5/2011 | Frazier et al. |
| 7,949,849 | B2 | 5/2011 | Lowe et al. |
| 8,006,305 | B2 | 8/2011 | Aziz |
| 8,020,206 | B2 | 9/2011 | Hubbard et al. |
| 8,045,458 | B2 | 10/2011 | Alperovitch et al. |
| 8,069,484 | B2 | 11/2011 | McMillan et al. |
| 8,171,553 | B2 | 5/2012 | Aziz et al. |
| 8,201,246 | B1 | 6/2012 | Wu et al. |
| 8,204,984 | B1 | 6/2012 | Aziz et al. |
| 8,214,905 | B1 | 7/2012 | Doukhvalov et al. |
| 8,291,499 | B2 | 10/2012 | Aziz et al. |
| 8,370,938 | B1 | 2/2013 | Daswani et al. |
| 8,370,939 | B2 | 2/2013 | Zaitsev et al. |
| 8,375,444 | B2 | 2/2013 | Aziz et al. |
| 8,438,644 | B2 | 5/2013 | Watters et al. |
| 8,464,340 | B2 | 6/2013 | Ahn et al. |
| 8,494,974 | B2 | 7/2013 | Watters et al. |
| 8,516,593 | B2 | 8/2013 | Aziz |
| 8,528,086 | B1 | 9/2013 | Aziz |
| 8,539,582 | B1 | 9/2013 | Aziz et al. |
| 8,549,638 | B2 | 10/2013 | Aziz |
| 8,561,177 | B1 | 10/2013 | Aziz et al. |
| 8,566,476 | B2 | 10/2013 | Shiffer et al. |
| 8,566,946 | B1 | 10/2013 | Aziz et al. |
| 8,584,239 | B2 | 11/2013 | Aziz et al. |
| 8,635,696 | B1 | 1/2014 | Aziz |
| 8,689,333 | B2 | 4/2014 | Aziz |
| 8,713,681 | B2 | 4/2014 | Silberman et al. |
| 8,776,229 | B1 | 7/2014 | Aziz |
| 8,793,278 | B2 | 7/2014 | Frazier et al. |
| 8,793,787 | B2 | 7/2014 | Ismael et al. |
| 8,813,050 | B2 | 8/2014 | Watters et al. |
| 8,832,829 | B2 | 9/2014 | Manni et al. |
| 8,850,571 | B2 | 9/2014 | Staniford et al. |
| 8,881,271 | B2 | 11/2014 | Butler, II |
| 8,881,282 | B1 | 11/2014 | Aziz et al. |
| 8,898,788 | B1 | 11/2014 | Aziz et al. |
| 8,935,779 | B2 | 1/2015 | Manni et al. |
| 8,949,257 | B2 | 2/2015 | Shiffer et al. |
| 8,984,638 | B1 | 3/2015 | Aziz et al. |
| 8,990,939 | B2 | 3/2015 | Staniford et al. |
| 8,990,944 | B1 | 3/2015 | Singh et al. |
| 8,997,219 | B2 | 3/2015 | Staniford et al. |
| 9,009,822 | B1 | 4/2015 | Ismael et al. |
| 9,009,823 | B1 | 4/2015 | Ismael et al. |
| 9,015,846 | B2 | 4/2015 | Watters et al. |
| 9,027,135 | B1 | 5/2015 | Aziz |
| 9,071,638 | B1 | 6/2015 | Aziz et al. |
| 9,104,867 | B1 | 8/2015 | Thioux et al. |
| 9,106,630 | B2 | 8/2015 | Frazier et al. |
| 9,106,694 | B2 | 8/2015 | Aziz et al. |
| 9,118,715 | B2 | 8/2015 | Staniford et al. |
| 9,159,035 | B1 | 10/2015 | Ismael et al. |
| 9,171,160 | B2 | 10/2015 | Vincent et al. |
| 9,176,843 | B1 | 11/2015 | Ismael et al. |
| 9,189,627 | B1 | 11/2015 | Islam |
| 9,195,829 | B1 | 11/2015 | Goradia et al. |
| 9,197,664 | B1 | 11/2015 | Aziz et al. |
| 9,223,972 | B1 | 12/2015 | Vincent et al. |
| 9,225,740 | B1 | 12/2015 | Ismael et al. |
| 9,241,010 | B1 | 1/2016 | Bennett et al. |
| 9,251,343 | B1 | 2/2016 | Vincent et al. |
| 9,262,635 | B2 | 2/2016 | Paithane et al. |
| 9,268,936 | B2 | 2/2016 | Butler |
| 9,275,229 | B2 | 3/2016 | LeMasters |
| 9,282,109 | B1 | 3/2016 | Aziz et al. |
| 9,292,686 | B2 | 3/2016 | Ismael et al. |
| 9,294,501 | B2 | 3/2016 | Mesdaq et al. |
| 9,300,686 | B2 | 3/2016 | Pidathala et al. |
| 9,306,960 | B1 | 4/2016 | Aziz |
| 9,306,974 | B1 | 4/2016 | Aziz et al. |
| 9,311,479 | B1 | 4/2016 | Manni et al. |
| 9,355,247 | B1 | 5/2016 | Thioux et al. |
| 9,356,944 | B1 | 5/2016 | Aziz |
| 9,363,280 | B1 | 6/2016 | Rivlin et al. |
| 9,367,681 | B1 | 6/2016 | Ismael et al. |
| 9,398,028 | B1 | 7/2016 | Karandikar et al. |
| 9,413,781 | B2 | 8/2016 | Cunningham et al. |
| 9,426,071 | B1 | 8/2016 | Caldejon et al. |
| 9,430,646 | B1 | 8/2016 | Mushtaq et al. |
| 9,432,389 | B1 | 8/2016 | Khalid et al. |
| 9,438,613 | B1 | 9/2016 | Paithane et al. |
| 9,438,622 | B1 | 9/2016 | Staniford et al. |
| 9,438,623 | B1 | 9/2016 | Thioux et al. |
| 9,459,901 | B2 | 10/2016 | Jung et al. |
| 9,467,460 | B1 | 10/2016 | Otvagin et al. |
| 9,483,644 | B1 | 11/2016 | Paithane et al. |
| 9,495,180 | B2 | 11/2016 | Ismael |
| 9,497,213 | B2 | 11/2016 | Thompson et al. |
| 9,507,935 | B2 | 11/2016 | Ismael et al. |
| 9,516,057 | B2 | 12/2016 | Aziz |
| 9,519,782 | B2 | 12/2016 | Aziz et al. |
| 9,536,091 | B2 | 1/2017 | Paithane et al. |
| 9,537,972 | B1 | 1/2017 | Edwards et al. |
| 9,560,059 | B1 | 1/2017 | Islam |
| 9,565,202 | B1 | 2/2017 | Kindlund et al. |
| 9,591,015 | B1 | 3/2017 | Amin et al. |
| 9,591,020 | B1 | 3/2017 | Aziz |
| 9,594,904 | B1 | 3/2017 | Jain et al. |
| 9,594,905 | B1 | 3/2017 | Ismael et al. |
| 9,594,912 | B1 | 3/2017 | Thioux et al. |
| 9,609,007 | B1 | 3/2017 | Rivlin et al. |
| 9,626,509 | B1 | 4/2017 | Khalid et al. |
| 9,628,498 | B1 | 4/2017 | Aziz et al. |
| 9,628,507 | B2 | 4/2017 | Haq et al. |
| 9,633,134 | B2 | 4/2017 | Ross |
| 9,635,039 | B1 | 4/2017 | Islam et al. |
| 9,641,546 | B1 | 5/2017 | Manni et al. |
| 9,654,485 | B1 | 5/2017 | Neumann |
| 9,661,009 | B1 | 5/2017 | Karandikar et al. |
| 9,661,018 | B1 | 5/2017 | Aziz |
| 9,674,298 | B1 | 6/2017 | Edwards et al. |
| 9,680,862 | B2 | 6/2017 | Ismael et al. |
| 9,690,606 | B1 | 6/2017 | Ha et al. |
| 9,690,933 | B1 | 6/2017 | Singh et al. |
| 9,690,935 | B2 | 6/2017 | Shiffer et al. |
| 9,690,936 | B1 | 6/2017 | Malik et al. |
| 9,736,179 | B2 | 8/2017 | Ismael |
| 9,740,857 | B2 | 8/2017 | Ismael et al. |
| 9,747,446 | B1 | 8/2017 | Pidathala et al. |
| 9,749,343 | B2 | 8/2017 | Watters et al. |
| 9,749,344 | B2 | 8/2017 | Watters et al. |
| 9,756,074 | B2 | 9/2017 | Aziz et al. |
| 9,773,112 | B1 | 9/2017 | Rathor et al. |
| 9,781,144 | B1 | 10/2017 | Otvagin et al. |
| 9,787,700 | B1 | 10/2017 | Amin et al. |
| 9,787,706 | B1 | 10/2017 | Otvagin et al. |
| 9,792,196 | B1 | 10/2017 | Ismael et al. |
| 9,824,209 | B1 | 11/2017 | Ismael et al. |
| 9,824,211 | B2 | 11/2017 | Wilson |

(56) References Cited

U.S. PATENT DOCUMENTS

| | | |
|---|---|---|
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,892,261 B2 | 2/2018 | Joram et al. |
| 9,904,955 B2 | 2/2018 | Watters et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,063,583 B2 | 8/2018 | Watters et al. |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,742 B1 * | 11/2018 | Oprea ............... H04L 63/1425 |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,282,548 B1 | 5/2019 | Aziz et al. |
| 10,284,574 B1 | 5/2019 | Aziz et al. |
| 10,284,575 B2 | 5/2019 | Paithane et al. |
| 10,296,437 B2 | 5/2019 | Ismael et al. |
| 10,335,738 B1 | 7/2019 | Paithane et al. |
| 10,341,363 B1 | 7/2019 | Vincent et al. |
| 10,341,365 B1 | 7/2019 | Ha |
| 10,366,231 B1 | 7/2019 | Singh et al. |
| 10,380,343 B1 | 8/2019 | Jung et al. |
| 10,395,029 B1 | 8/2019 | Steinberg |
| 10,404,725 B1 | 9/2019 | Rivlin et al. |
| 10,417,031 B2 | 9/2019 | Paithane et al. |
| 10,430,586 B1 | 10/2019 | Paithane et al. |
| 10,432,649 B1 | 10/2019 | Bennett et al. |
| 10,445,502 B1 | 10/2019 | Desphande et al. |
| 10,447,728 B1 | 10/2019 | Steinberg |
| 10,454,950 B1 | 10/2019 | Aziz |
| 10,454,953 B1 | 10/2019 | Amin et al. |
| 10,462,173 B1 | 10/2019 | Aziz et al. |
| 10,467,411 B1 | 11/2019 | Pidathala et al. |
| 10,467,414 B1 | 11/2019 | Kindlund et al. |
| 10,469,512 B1 | 11/2019 | Ismael |
| 10,474,813 B1 | 11/2019 | Ismael |
| 10,476,906 B1 | 11/2019 | Siddiqui |
| 10,476,909 B1 | 11/2019 | Aziz et al. |
| 10,491,627 B1 | 11/2019 | Su |
| 10,503,904 B1 | 12/2019 | Singh et al. |
| 10,505,956 B1 | 12/2019 | Pidathala et al. |
| 10,511,614 B1 | 12/2019 | Aziz |
| 10,515,214 B1 | 12/2019 | Vincent et al. |
| 10,523,609 B1 | 12/2019 | Subramanian |
| 10,528,726 B1 | 1/2020 | Ismael |
| 10,534,906 B1 | 1/2020 | Paithane et al. |
| 10,552,610 B1 | 2/2020 | Vashisht et al. |
| 10,554,507 B1 | 2/2020 | Siddiqui et al. |
| 10,565,378 B1 | 2/2020 | Vincent et al. |
| 10,567,405 B1 | 2/2020 | Aziz |
| 10,572,665 B2 | 2/2020 | Jung et al. |
| 10,581,874 B1 | 3/2020 | Khalid et al. |
| 10,581,879 B1 | 3/2020 | Paithane et al. |
| 10,581,898 B1 | 3/2020 | Singh |
| 10,587,636 B1 | 3/2020 | Aziz et al. |
| 10,587,647 B1 | 3/2020 | Khalid et al. |
| 10,592,678 B1 | 3/2020 | Ismael et al. |
| 10,601,848 B1 | 3/2020 | Jeyaraman et al. |
| 10,601,863 B1 | 3/2020 | Siddiqui |
| 10,601,865 B1 | 3/2020 | Mesdaq et al. |
| 10,616,266 B1 | 4/2020 | Otvagin |
| 10,621,338 B1 | 4/2020 | Pfoh et al. |
| 10,623,434 B1 | 4/2020 | Aziz et al. |
| 10,637,880 B1 | 4/2020 | Islam et al. |
| 10,642,753 B1 | 5/2020 | Steinberg |
| 10,657,251 B1 | 5/2020 | Malik et al. |
| 10,666,686 B1 | 5/2020 | Singh et al. |
| 10,671,721 B1 | 6/2020 | Otvagin et al. |
| 10,671,726 B1 | 6/2020 | Paithane et al. |
| 10,701,091 B1 | 6/2020 | Cunningham et al. |
| 10,706,149 B1 | 7/2020 | Vincent |
| 10,713,358 B2 | 7/2020 | Sikorski et al. |
| 10,713,362 B1 | 7/2020 | Vincent et al. |
| 10,715,542 B1 | 7/2020 | Wei et al. |
| 10,726,127 B1 | 7/2020 | Steinberg |
| 10,728,263 B1 | 7/2020 | Neumann |
| 10,735,458 B1 | 8/2020 | Haq et al. |
| 10,740,456 B1 | 8/2020 | Ismael et al. |
| 10,747,872 B1 | 8/2020 | Ha et al. |
| 10,757,120 B1 | 8/2020 | Aziz et al. |
| 10,757,134 B1 | 8/2020 | Eyada |
| 10,785,255 B1 | 9/2020 | Otvagin et al. |
| 10,791,138 B1 | 9/2020 | Siddiqui et al. |
| 10,795,991 B1 | 10/2020 | Ross et al. |
| 10,798,112 B2 | 10/2020 | Siddiqui et al. |
| 10,798,121 B1 | 10/2020 | Khalid et al. |
| 10,805,340 B1 | 10/2020 | Goradia |
| 10,805,346 B2 | 10/2020 | Kumar et al. |
| 10,812,513 B1 | 10/2020 | Manni et al. |
| 10,817,606 B1 | 10/2020 | Vincent |
| 10,826,931 B1 | 11/2020 | Quan et al. |
| 10,826,933 B1 | 11/2020 | Ismael et al. |
| 10,834,107 B1 | 11/2020 | Paithane et al. |
| 10,846,117 B1 | 11/2020 | Steinberg |
| 10,848,397 B1 | 11/2020 | Siddiqui et al. |
| 10,848,521 B1 | 11/2020 | Thioux et al. |
| 10,855,700 B1 | 12/2020 | Jeyaraman et al. |
| 10,868,818 B1 | 12/2020 | Rathor et al. |
| 10,872,151 B1 | 12/2020 | Kumar et al. |
| 10,873,597 B1 | 12/2020 | Mehra et al. |

(56) References Cited

U.S. PATENT DOCUMENTS

| | | |
|---|---|---|
| 10,887,328 B1 | 1/2021 | Paithane et al. |
| 10,893,059 B1 | 1/2021 | Aziz et al. |
| 10,893,068 B1 | 1/2021 | Khalid et al. |
| 10,902,117 B1 | 1/2021 | Singh et al. |
| 10,902,119 B1 | 1/2021 | Vashisht et al. |
| 10,904,286 B1 | 1/2021 | Liu |
| 10,929,266 B1 | 2/2021 | Goradia et al. |
| 11,436,327 B1 * | 9/2022 | Vashisht ................ G06F 21/54 |
| 11,522,884 B1 | 12/2022 | Vashisht et al. |
| 11,537,627 B1 | 12/2022 | Baskaran et al. |
| 11,550,900 B1 | 1/2023 | Engels et al. |
| 11,570,204 B2 | 1/2023 | Crabtree et al. |
| 11,570,209 B2 | 1/2023 | Crabtree et al. |
| 11,838,300 B1 | 12/2023 | Vashisht et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2003/0084318 A1 | 5/2003 | Schertz |
| 2003/0188190 A1 | 10/2003 | Aaron et al. |
| 2003/0191957 A1 | 10/2003 | Hypponen et al. |
| 2004/0015712 A1 | 1/2004 | Szor |
| 2004/0019832 A1 | 1/2004 | Arnold et al. |
| 2004/0117478 A1 | 6/2004 | Triulzi et al. |
| 2004/0117624 A1 | 6/2004 | Brandt et al. |
| 2004/0236963 A1 | 11/2004 | Danford et al. |
| 2004/0255161 A1 | 12/2004 | Cavanaugh |
| 2004/0268147 A1 | 12/2004 | Wiederin et al. |
| 2005/0021740 A1 | 1/2005 | Bar et al. |
| 2005/0086523 A1 | 4/2005 | Zimmer et al. |
| 2005/0091513 A1 | 4/2005 | Mitomo et al. |
| 2005/0108562 A1 | 5/2005 | Khazan et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0238005 A1 | 10/2005 | Chen et al. |
| 2005/0262562 A1 | 11/2005 | Gassoway |
| 2005/0283839 A1 | 12/2005 | Cowburn |
| 2006/0010495 A1 | 1/2006 | Cohen et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0031476 A1 | 2/2006 | Mathes et al. |
| 2006/0070130 A1 | 3/2006 | Costea et al. |
| 2006/0117385 A1 | 6/2006 | Mester et al. |
| 2006/0123477 A1 | 6/2006 | Raghavan et al. |
| 2006/0150249 A1 | 7/2006 | Gassen et al. |
| 2006/0161987 A1 | 7/2006 | Levy-Yurista |
| 2006/0173992 A1 | 8/2006 | Weber et al. |
| 2006/0191010 A1 | 8/2006 | Benjamin |
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0064689 A1 | 3/2007 | Shin et al. |
| 2007/0143827 A1 | 6/2007 | Nicodemus et al. |
| 2007/0157306 A1 | 7/2007 | Elrod et al. |
| 2007/0192858 A1 | 8/2007 | Lum |
| 2007/0208822 A1 | 9/2007 | Wang et al. |
| 2007/0240218 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2008/0005782 A1 | 1/2008 | Aziz |
| 2008/0040710 A1 | 2/2008 | Chiriac |
| 2008/0072326 A1 | 3/2008 | Danford et al. |
| 2008/0077793 A1 | 3/2008 | Tan et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0189787 A1 | 8/2008 | Arnold et al. |
| 2008/0307524 A1 | 12/2008 | Singh et al. |
| 2008/0320594 A1 | 12/2008 | Jiang |
| 2009/0003317 A1 | 1/2009 | Kasralikar et al. |
| 2009/0064332 A1 | 3/2009 | Porras et al. |
| 2009/0083855 A1 | 3/2009 | Apap et al. |
| 2009/0125976 A1 | 5/2009 | Wassermann et al. |
| 2009/0126015 A1 | 5/2009 | Monastyrsky et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0241190 A1 | 9/2009 | Todd et al. |
| 2009/0300589 A1 | 12/2009 | Watters et al. |
| 2010/0017546 A1 | 1/2010 | Poo et al. |
| 2010/0030996 A1 | 2/2010 | Butler, II |
| 2010/0058474 A1 | 3/2010 | Hicks |
| 2010/0077481 A1 | 3/2010 | Polyakov et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0192223 A1 | 7/2010 | Ismael et al. |
| 2010/0281542 A1 | 11/2010 | Stolfo et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0099635 A1 | 4/2011 | Silberman et al. |
| 2011/0167493 A1 | 7/2011 | Song et al. |
| 2011/0173213 A1 | 7/2011 | Frazier et al. |
| 2011/0178942 A1 | 7/2011 | Watters et al. |
| 2011/0219450 A1 | 9/2011 | McDougal et al. |
| 2011/0225624 A1 | 9/2011 | Sawhney et al. |
| 2011/0247072 A1 | 10/2011 | Staniford et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0210423 A1 | 8/2012 | Friedrichs et al. |
| 2012/0222121 A1 | 8/2012 | Staniford et al. |
| 2012/0233698 A1 | 9/2012 | Watters et al. |
| 2012/0278886 A1 | 11/2012 | Luna |
| 2012/0331553 A1 | 12/2012 | Aziz et al. |
| 2013/0036472 A1 | 2/2013 | Aziz |
| 2013/0047257 A1 | 2/2013 | Aziz |
| 2013/0097706 A1 | 4/2013 | Titonis et al. |
| 2013/0185795 A1 | 7/2013 | Winn et al. |
| 2013/0227691 A1 | 8/2013 | Aziz et al. |
| 2013/0232577 A1 | 9/2013 | Watters et al. |
| 2013/0247186 A1 | 9/2013 | LeMasters |
| 2013/0282426 A1 | 10/2013 | Watters et al. |
| 2013/0291109 A1 | 10/2013 | Staniford et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0297494 A1 | 10/2014 | Watters et al. |
| 2014/0337836 A1 | 11/2014 | Ismael |
| 2014/0344926 A1 | 11/2014 | Cunningham et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |

(56) References Cited

U.S. PATENT DOCUMENTS

| | | |
|---|---|---|
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0149943 A1* | 5/2016 | Kaloroumakis .... H04L 63/1425 726/23 |
| 2016/0191547 A1 | 6/2016 | Zafar et al. |
| 2016/0191550 A1 | 6/2016 | Ismael et al. |
| 2016/0241580 A1 | 8/2016 | Watters et al. |
| 2016/0241581 A1 | 8/2016 | Watters et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0323295 A1 | 11/2016 | Joram et al. |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0054458 A1* | 2/2018 | Marck ................ H04L 63/1458 |
| 2018/0069891 A1 | 3/2018 | Watters et al. |
| 2018/0121316 A1 | 5/2018 | Ismael et al. |
| 2018/0288077 A1* | 10/2018 | Siddiqui ............ H04L 63/1416 |
| 2018/0375886 A1 | 12/2018 | Kirti et al. |
| 2019/0068619 A1 | 2/2019 | Fan et al. |
| 2019/0104154 A1 | 4/2019 | Kumar et al. |
| 2019/0132334 A1 | 5/2019 | Johns et al. |
| 2019/0141079 A1* | 5/2019 | Vidas ....................... G06N 7/01 |
| 2019/0207966 A1 | 7/2019 | Vashisht et al. |
| 2019/0207967 A1 | 7/2019 | Vashisht et al. |
| 2020/0021620 A1* | 1/2020 | Purathepparambil ....................... H04L 63/102 |
| 2020/0241911 A1 | 7/2020 | Honnavalli |
| 2020/0252428 A1 | 8/2020 | Gardezi et al. |
| 2020/0257815 A1 | 8/2020 | Huang et al. |
| 2020/0327124 A1 | 10/2020 | Rosen et al. |
| 2020/0341920 A1 | 10/2020 | Spitz et al. |
| 2021/0117251 A1* | 4/2021 | Cristofi ................ G06F 21/554 |
| 2022/0210200 A1* | 6/2022 | Crabtree .............. G06F 16/951 |
| 2022/0210202 A1* | 6/2022 | Crabtree ............ G06F 16/2477 |
| 2022/0215101 A1* | 7/2022 | Rioux .................. G06F 21/577 |
| 2022/0224707 A1* | 7/2022 | Kapoor .................. G06F 9/455 |
| 2022/0224723 A1* | 7/2022 | Crabtree ................ H04L 63/20 |
| 2022/0232024 A1* | 7/2022 | Kapoor .................. G06F 21/57 |
| 2022/0232040 A1* | 7/2022 | Crabtree ................ H04L 63/20 |
| 2022/0245539 A1* | 8/2022 | Clearwater ........ G06Q 10/0635 |
| 2022/0247678 A1* | 8/2022 | Atwal .................. H04L 45/645 |
| 2022/0247769 A1* | 8/2022 | Erlingsson ............ G06F 9/5072 |
| 2022/0255926 A1* | 8/2022 | Crabtree ............ H04L 63/1425 |
| 2022/0255969 A1* | 8/2022 | Cage .......................... H04L 9/50 |
| 2022/0263860 A1* | 8/2022 | Crabtree ............ H04L 63/1425 |
| 2022/0279004 A1* | 9/2022 | Erlingsson .............. G06F 17/40 |
| 2022/0294816 A1* | 9/2022 | Martin ................ H04L 67/535 |
| 2022/0303295 A1* | 9/2022 | Erlingsson .......... G06F 16/9038 |
| 2022/0311794 A1* | 9/2022 | Maya .................. G06F 11/0766 |
| 2022/0329616 A1* | 10/2022 | O'Hearn ................ H04L 63/10 |
| 2022/0351237 A1* | 11/2022 | Dasgupta ........... G06Q 30/0243 |
| 2022/0353244 A1* | 11/2022 | Kahn ...................... H04L 67/12 |
| 2022/0360600 A1* | 11/2022 | Reed .................... G06F 16/9537 |
| 2022/0400129 A1 | 12/2022 | Kapoor et al. |
| 2022/0400130 A1 | 12/2022 | Kapoor et al. |
| 2023/0007483 A1 | 1/2023 | Mueck et al. |
| 2023/0008173 A1 | 1/2023 | Crabtree et al. |
| 2023/0014242 A1 | 1/2023 | Dangu et al. |
| 2023/0032686 A1 | 2/2023 | Williams et al. |
| 2023/0034035 A1* | 2/2023 | Yavo ........................ G06F 18/24 |
| 2024/0080329 A1* | 3/2024 | Reed .................... G06F 16/9038 |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.jsp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulouse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M.I. , "PyFlag—An advanced network forensic framework", Digital investigation 5, Elsevier, (2008), pp. S112-S120.

Costa, M. , et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Distler, "Malware Analysis: An Introduction", SANS Institute InfoSec Reading Room, SANS Institute, (2007).

Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

FireEye Malware Analysis & Exchange Network, Malware Protection System, FireEye Inc., 2010.

FireEye Malware Analysis, Modern Malware Forensics, FireEye Inc., 2010.

(56) References Cited

OTHER PUBLICATIONS

FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham , "Insertion, Evasion, and Denial of Service: Eluding Network Intrusion Detection", Secure Networks, ("Ptacek"), (Jan. 1998).
U.S. Appl. No. 17/133,397, filed Dec. 23, 2020, Non-Final Office Action dated Feb. 23, 2023.
U.S. Appl. No. 17/133,397, filed Dec. 23, 2020, Notice of Allowance dated Jul. 19, 2023.
Venezia, Paul , "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

RUN-TIME CONFIGURABLE CYBERSECURITY SYSTEM

CROSS-REFERENCE TO RELATED APPLICATIONS

This application is a continuation of U.S. patent application Ser. No. 17/133,397, filed Dec. 23, 2020, now U.S. Pat. No. 11,838,300, issued Dec. 5, 2023, which claims the benefit of priority on U.S. Provisional Application No. 62/953,422 filed on Dec. 24, 2019, the entire content of which are incorporated by reference herein.

FIELD

Embodiments of the disclosure relate to the field of cybersecurity. More specifically, one embodiment of the disclosure relates to a system architecture directed to cybersecurity threat detection and a corresponding method thereof.

GENERAL BACKGROUND

In the past, businesses have relied on application software installed on one or more electronic devices residing in close proximity to its user (hereinafter, "on-premises electronic devices"). Each on-premises electronic device may constitute a type of computer such as a personal computer, a locally maintained mainframe, or a local server for example. As on-premises electronic devices became subjected to cybersecurity attacks (cyberattacks) more regularly, in order to protect these electronic devices, certain preeminent cybersecurity vendors began to develop and deploy on-premises threat detection appliances.

For on-premises deployments, a customer has to purchase threat detection appliances from a cybersecurity vendor, which requires both a significant upfront capital outlay for the purchase of the appliances as well as significant ongoing operational costs. These operational costs may include the costs for deploying, managing, maintaining, upgrading, repairing and replacing these appliances. For instance, a customer may be required to install multiple types of threat detection appliances within the enterprise network in order to detect different types of cybersecurity threats (cyberthreats). These cyberthreats may coincide with discrete activities associated with known or highly suspected cyberattacks.

As an illustrative example, a cybersecurity vendor would need to install one type of on-premises threat detection appliance that is directed to analyze electronic mail (email) messages for malware, normally ingress email messages from an outside source. Similarly, the cybersecurity vendor would need to install another type of on-premises threat detection appliance to analyze web-based content (e.g., downloaded web pages and related network traffic) in effort to detect cyberthreats such as web pages embedded with malware. Herein, "malware" may be generally considered to be software (e.g., executable) that is coded to cause a recipient electronic device to perform unauthorized, unexpected, anomalous, and/or unwanted behaviors or operations (hereinafter, "malicious behaviors"), such as altering the functionality of an electronic device upon execution of the malware.

Cybersecurity vendors have provided threat detection through cloud-based offerings that are self-hosted by these vendors. Herein, the responsibility for the above-described upfront capital outlays and ongoing operational costs is shifted from the customer to the cybersecurity vendor. As a result, the cybersecurity vendor are now saddled with even greater overall costs than a customer itself because the cybersecurity vendor must deploy infrastructure resources sized to handle the maximum aggregate threat detection analytic workload for all of its customers. These overall costs, directed to data processing and storage usage would need to be passed on to its customers, where any significant cost increases may translate into a significant price increases for the cybersecurity services. As a result, customers are unable to accurately estimate or anticipate the costs associated with current and future cybersecurity needs, given that impact that changes in cybersecurity need, amongst all of the customers, may influence the costs apportioned for processing or storage usage.

Recently, more businesses and individuals have begun to rely on a public cloud network (hereinafter, "public cloud") for all types of services, including cybersecurity services offered by the cloud provider. A "public cloud" is a fully virtualized environment with a multi-tenant architecture that enables tenants (i.e., customers) to establish different cloud accounts, but share computing and storage resources and retain the isolation of data within each customer's cloud account. The virtualized environment includes on-demand, cloud computing platforms that are provided by a collection of physical data centers, where each data center includes numerous servers hosted by the cloud provider. Examples of different types of public clouds may include, but is not limited or restricted to Amazon Web Services®, Microsoft® Azure® or Google Cloud Platform™ for example.

Comprehensive cloud-based cybersecurity services are not know to be provided. Instead, cybersecurity services offered by cloud providers are typically limited to protecting its own infrastructure. The lack of cybersecurity vendor offerings in the public cloud, where the public cloud operates as an Infrastructure-as-a-Service (IaaS) cloud service, is due in large part to the fact that such a deployment is highly complex, especially when a common interface for object analytics is crucial for subscriber acceptance and ease of use, and a great number of keys for subscriber authentication is required.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1A:
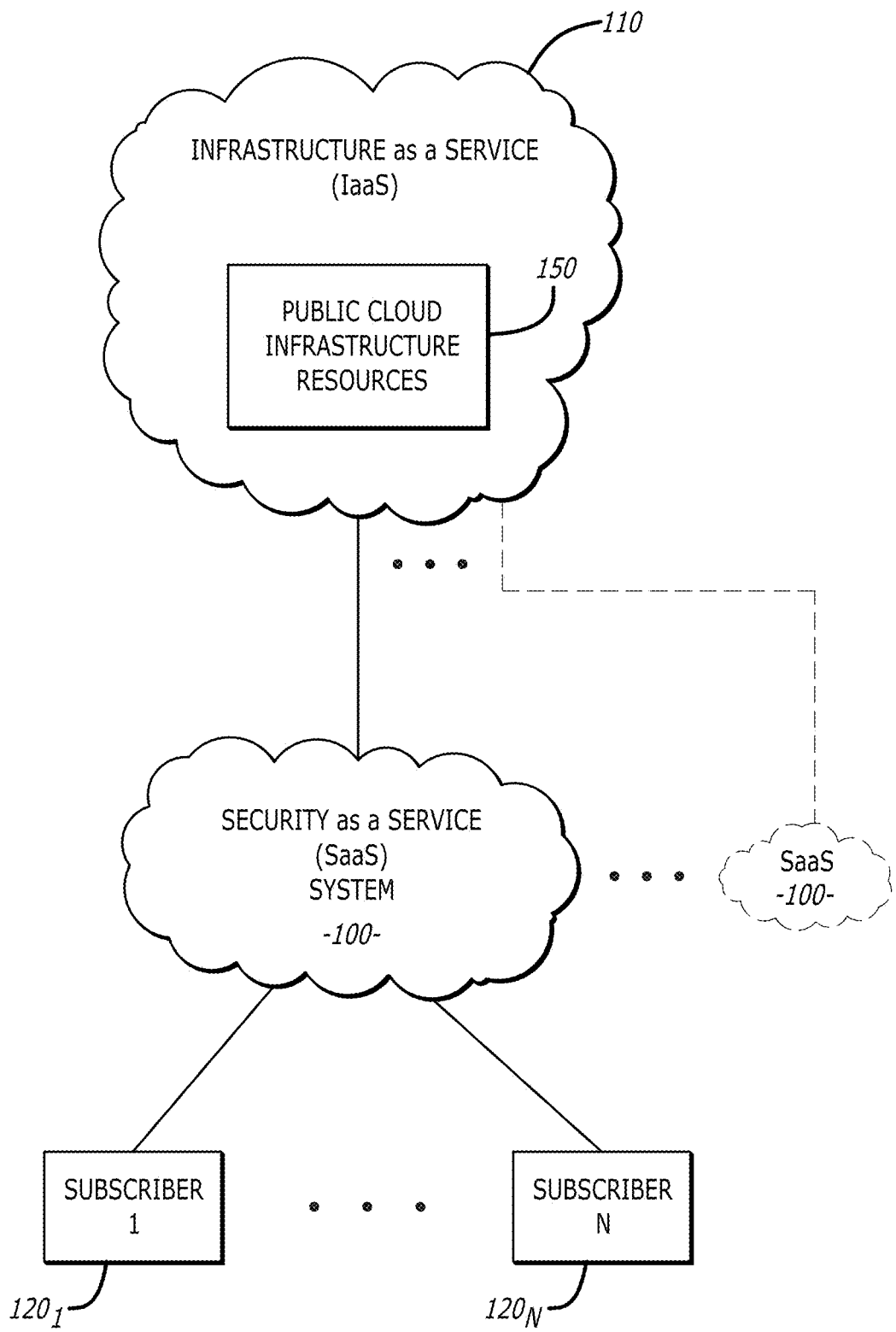
FIG. 1A is a block diagram of an exemplary embodiment of a cloud-based cybersecurity system deployed as a Security-as-a Service (SaaS) layered on a public cloud operating as an Infrastructure-as-a-Service (IaaS).

Embodiments of the present disclosure generally relate to a cloud-based cybersecurity system leveraging resources associated with the infrastructure provided by a public cloud. One embodiment of the cybersecurity system operates as a multi-tenant (subscription-based) Security-as-a-Service (SaaS), which is layered on a multi-tenant Infrastructure-as-a-Service (IaaS) cloud platform. As a result, multiple subscribers may be afforded access to cybersecurity services offered by the cybersecurity system while multiple users, including the cybersecurity system, may be afforded access to shared resources hosted by the public cloud (hereinafter, "public cloud infrastructure resources"). Stated differently, as the SaaS-operating cybersecurity system (hereinafter, "cybersecurity system" or "SaaS") may be installed by a cybersecurity vendor being a different entity than the cloud provider, the SaaS may deploy a vendor-specific proprietary software stack to run on the compute and storage resources provided by the IaaS cloud platform.

In light of this dual, multi-tenant deployment, the cybersecurity system may be configured to charge usage in accordance with a different pricing scheme than offered by the IaaS (public cloud). For example, the cybersecurity system may be configured with a tiered subscription pricing scheme based on a number of submissions of objects undergoing cyberthreat analytics by the cybersecurity system (e.g., the number of objects uploaded via a portal or other type of interface or the number of objects processed to account for objects created and processed during processing of another object if more details analytics are requested) along with additional subscription enrichments (e.g., enhanced reporting formats, memory dump capabilities, etc.). Additionally, or in the alternative, the cybersecurity system may be configured with a "pay per usage" pricing scheme, which enjoys no maximum submission thresholds over a prescribed duration but higher costs are applied to each submission.

As a result of the SaaS deployment described herein, the cybersecurity system enables both the customer and cybersecurity vendor to avoid the complexity and significant capital outlay in buying and operating physical servers and other datacenter infrastructure. Instead, the cybersecurity vendor incurs the costs associated with the actual use of certain public cloud infrastructure resources, such as storage amounts or compute time as measured by the time of data processing conducted by computing instances hosted by the public cloud and configured as analytic engines within the cybersecurity system as described below. The subscribers incur the costs associated with their actual number of object submissions for a determination as to whether the objects constitute a cyberthreat.

Unlike conventional cyberthreat detection appliances, the cybersecurity system is configured to be "submission agnostic," meaning that the same submission scheme may be followed for uploading different object types for analysis (e.g., email messages, web page content, uniform resource locators (URLs), hashes, files, documents, etc.) and/or the same multi-stage evaluation is conducted on a data sample, inclusive of that object and context information associated with the object, independent of object type. Herein, the architecture of the cybersecurity system is designed to conduct cyberthreat analytics on multiple types of objects uploaded to cybersecurity system by at least (i) validating a submission by confirming that requisite information is included within the submission, (ii) authenticating the subscriber that input the submission, and/or (iii) verifying the subscriber is authorized to perform the task(s) associated with the submission. Upon successful validation, authentication and/or verification of a particular type of submission, such as a data sample submission for example, the cybersecurity system conducts cyberthreat analytics on the object in accordance with a multi-stage evaluation that is submission agnostic (i.e., evaluation stages do not change based on the object type).

I. GENERAL SUMMARY

A. Overview

In general, the cybersecurity system may be configured to receive multiple types of objects through an interface (e.g., a cybersecurity portal, device interface including one or more Application Programming Interfaces "APIs", etc.) upon completion of a subscriber onboarding process. Upon receipt of an object included as part of a data sample, the cybersecurity system may validate the data sample submission by confirming that the submission includes requisite information such as credential(s), a subscription identifier (hereinafter, "Subscription ID"), or the like. Additionally, the cybersecurity system may authenticate the subscriber by confirming that the submitted credential is active and verify that the subscriber is authorized to perform the requested task(s) through analysis of entitlements made available to the subscriber based on its chosen subscription type as identified by the Subscription ID (e.g., subscription parameters such as access privileges, data sample submission thresholds, virtual key allocation threshold, etc.).

Based on data sample submission validation, subscriber authentication, and task verification, the cybersecurity system may conduct cyberthreat analytics on the object, namely analyses conducted on the object and/or context information associated with the object. The context information may include meta-information associated with the object (object context), meta-information associated with the subscription (entitlement context), and/or meta-information associated with the submission (submission context). As illustrative examples, as described below, the "submission context" may include meta-information pertaining to the submission, such as the time of input, origin of the object included in the submission (e.g., from email, network cloud shared drive, network transmission medium, etc.), location of the subscriber's network device providing the object, or the like. The "entitlement context" may include meta-information pertaining to the subscription selected by subscriber, such as information directed to what features are permitted by the subscription (e.g., types of analytics supported, reporting formats available, or other features may distinguish different subscription tiers). Lastly, the "object context" may include meta-information pertaining to the object, such as its extension type.

Herein, according to one embodiment of the disclosure, the analytic engines may be selected based, at least in part, on the submission context, entitlement context and/or the object context. As a result, the analytic engines may be selected as a combination of any single type or any combination of two or more types of the following analytic engines: (i) static analytic engines that conduct an analysis on the content of an object and generate results including observed features represented by characteristics of the object (and accompanying context information); (ii) dynamic analytic engines that conduct an execution of the object and generate results including features represented by observed behaviors of the analytic engine (and accompanying context information); (iii) machine learning analytic engines that conduct extraction of insights from the submitted object and context information using a trained model and generate results including features represented by a probability of an object being malicious (and accompanying context information); and/or (iv) emulation analytic engines that conduct reproduction of operations representing the execution of the object without such execution and generate results including features represented by the behaviors observed during emulation (and accompanying context information).

Thereafter, the generated results (features) produced by the cyberthreat analytics conducted on the object (and its context information) are correlated with features of known malicious objects and/or known benign objects to determine a threat verdict for the object (e.g., malicious/benign, good/bad. high-risk/low-risk or any other measurement to signify the likelihood of the object being malicious or non-malicious). Based on the assigned threat verdict, the cybersecurity system may be further configured to conduct post-processing analytics based, at least in part, on the correlated results in order to determine what additional operations, if any, are to be conducted on the object. These operations may include retention of a portion of the context information associated with an identified malicious or benign object within the cybersecurity intelligence used by the cybersecurity system, transmission of the object to a forensic team for subsequent analysis, or the like.

In addition to conducting cyberthreat analytics, the cybersecurity system is configured to monitor and maintain, on a per subscriber basis, SaaS metrics. The SaaS metrics may include, inter alia, a sum total of data sample submissions made by a subscriber to the cybersecurity system (SaaS subscriber) during a selected time period and/or a sum total of active virtual keys currently issued to the SaaS subscriber. The SaaS metrics may be used for billing of the subscriber based on the number of data sample submissions made during a selected time period, and in some cases, to ensure compliance with subscription entitlements.

B. Architecture

Herein, the cybersecurity system includes an architecture that relies upon the public cloud infrastructure resources and monitors the usage of various services (e.g., data sample submissions, virtual key issuances, etc.) to ensure compliance with subscription entitlements as well as for reporting and billing purposes. According to one embodiment of the disclosure, the cybersecurity system operates as a multi-tenant, subscription-based SaaS), which leverages resources, such as compute and storage resources, hosted by an IaaS cloud platform, although other deployments are available and pertain to the broader spirit and scope of the invention. The cybersecurity system features (i) interface logic, (ii) administrative control logic, (iii) multi-stage, object evaluation logic, and (iv) reporting logic.

The interface logic enables communications to the administrative control logic to validate a submission, authenticate a subscriber associated with the submission, and verify that that the subscriber is authorized to perform one or more tasks associated with the submission. Depending on the submission type, upon submission validation, subscriber authentication and task verification, the interface logic enables the return of data requested by the submission to the subscriber or routes at least a portion of the submission to the object evaluation logic. For example, as an illustrative embodiment, the interface logic may include a cybersecurity portal that allows any user (potential subscriber) to register and establish a subscription with the cybersecurity system. After the subscription is established, the user (referred to as the "subscriber") may receive credentials to allow for the submission of objects (in the form of data samples including the object and its context information) uploaded via the cybersecurity portal for cyberthreat analytics, submission of queries for certain subscriber-based metrics, or submission of parameters for customizing functionality of the object evaluation logic akin to the subscriber's needs.

Additionally, after the subscription is established, the interface logic may be provided with an additional interface (hereinafter, "device interface"). The device interface includes logic supporting one or more APIs, where access to the APIs may depend on the subscription entitlements. The APIs may include a first API for the submission of objects (data samples including the object and its context information) for cyberthreat analytics, a second API for subscription management (e.g., ascertain the subscriber-based metrics), and a third API for management and/or customization of the functionality of analytic engines operating within the object evaluation logic.

The administrative control logic includes a subscription management module, a subscriber accounts data store, a credential (key) management module, a consumption quota monitoring module, a configuration management module, a system health assessment module, an auto-scaling module, and a subscription billing module. The subscriber accounts data store may be non-volatile, cloud-based storage hosted by the public cloud that is allocated to the IaaS subscriber (e.g., the cybersecurity vendor), where different portions of the subscriber accounts data store may be allocated to each SaaS subscriber. Therefore, each SaaS subscriber includes one or more virtual data stores that are secured and inaccessible by other SaaS subscribers. Other of the above-identified modules may be shared by the SaaS subscribers, where these modules are maintained with cloud-based storage hosted by the public cloud and operate based on execution of these modules by compute engines hosted by the public cloud.

The subscription management module is configured to control access to the cybersecurity system by controlling a subscriber onboarding process in which user information and financial information are acquired prior to selection, by the user, of a particular subscription tier. The subscription tiers may be allocated based on data sample submission thresholds, over a prescribed period of time, a desired number of submission sources (e.g., number of persons or network devices to be provided with a virtual key for subscriber authentication), or the like. Based on the chosen subscription tier, a subscription identifier (hereinafter, "Subscription ID") may be assigned to a subscription secured by the subscriber and stored within a particular portion of the subscriber accounts data store reserved for that subscriber, given that certain subscribers (e.g., large enterprises) may acquire multiple subscriptions and identification of a particular subscription associated with the submission may be necessary.

According to one embodiment of the disclosure, the subscriber accounts data store may be configured as (i) one or more virtual data stores each maintaining a record of the account data for a particular subscriber, (ii) one or more virtual data stores maintaining a collection of references (e.g., links, etc.) each directed to a different portion of cloud-based storage maintained in the aggregate for the IaaS subscriber (cybersecurity vendor), but allocated separately by the cybersecurity system to different SaaS subscribers to include account data, or (iii) a combination thereof (e.g., storage of credentials and/or personal identifiable information within the virtual data store(s) along with references to a remainder of the account data maintained at different virtual data stores.

Herein, according to one embodiment of the disclosure, subscriber account data may include any information (or meta-information) that may be used to identify the subscriber, provide subscription status, authenticate a subscriber based on credentials (e.g., tokens, keys or representatives thereof), identify certain entitlements to be provided to the data sample and other entitlements associated with the subscription to which compliance is required prior to the cybersecurity system completing a task requested by the submission, or the like. Hence, the subscriber account data may include a Subscription ID and information associated with the subscriber (e.g., contact information, financial information, location, etc.); subscription entitlements (e.g., subscription parameters such as data sample submission threshold, virtual key allocation threshold, additional enrichments based on the particular subscription directed to additional analytic capabilities made available to data samples from the particular subscriber, additional report formatting, etc.). Additionally, the subscriber account data may further maintain metrics pertaining to the subscription (e.g., SaaS metrics and/or IaaS metrics, etc.).

Within an embodiment of the administrative control logic, the credential (key) management module is deployed to control credential generation and subscriber authentication. In particular, upon establishing a subscription, the credential management module is notified to generate a first credential (referred to as a "master key") assigned to a subscriber associated with the subscription. The master key may be maintained as part of the subscriber account data, but it is not freely accessible to the subscriber. Instead, the master key may operate as a basis (e.g., seed keying material) used by the credential management module to generate second credentials (each referred to as a "virtual key"). In particular, according to one embodiment of the disclosure, each virtual key may be based, at least in part, on the contents of the master key. One or more virtual keys may be generated and returned to the subscriber in response to a key generation request submission, provided a sum total of the number of requested virtual keys and the number of active virtual keys do not exceed the subscription entitlements. A virtual key is included as part of a submission (e.g., data sample submission, consumption quota submission, parameter adjustment submission, etc.) to authenticate the subscriber and verify that the subscriber is authorized to perform the task associated with that submission. The virtual keys allow for tracking of usage of the cybersecurity system by different subscriber members (e.g., individuals, groups, departments, subsidiaries, etc.) as well as administrative control over access to the cybersecurity system, given that the virtual keys may be disabled, assigned prescribed periods of activity, or the like.

For this embodiment of the administrative control logic, the consumption quota monitoring module may be accessed via the second API (or cybersecurity portal) to enable the subscriber to obtain metrics associated with the current state of the subscription (e.g., active status, number of submissions for a particular submission type (or in total) conducted during the subscription period, number of submissions remaining for the subscription period, etc.). Additionally, the consumption quota monitoring module may be accessed by the credential management module in order to confirm an incoming submission does not exceed the data sample submission threshold. This reliance may occur if the credential management module is permitted access to the credential information (e.g., master key, virtual keys, etc.) of the subscriber account data.

The configuration management module is configured to enable a subscriber, via the third API (or cybersecurity portal), to specify parameters that control operability of the cyberthreat analytics. For instance, prior to controlling such operability, the credential management module, upon receipt of a parameter adjustment submission, may extract a virtual key included as part of the submission to authenticate the subscriber and verify that the subscriber is authorized to perform this task (parameter adjustment). Thereafter, contents of the parameter adjustment submission are routed to the configuration management module, which may alter stored parameters that may influence workflow, such as (i) operations of an analytic engine selection module deployed within the object evaluation logic of the cybersecurity system for selection of analytic engines, (ii) operations of the analytic engines, and/or (iii) operations of the correlation module, and/or (iv) operations of the post-processing module.

Having no visibility to a SaaS subscriber, the system health assessment module and the auto-scaling module are in communications with the object evaluation logic. In particular, the system health assessment module is configured to communicate with analytic engines, which are computing instances hosted by the cloud network that are configured to conduct cyberthreat analytics on the submitted objects. Based on these communications along with additional abilities to monitor queue storage levels and other public cloud infrastructure resources, the system health assessment module may be configured to ascertain the health of cloud-based processing resources (e.g., operating state, capacity level, etc.) to surmise the overall health of the cybersecurity system. The auto-scaling module is configured to (i) add additional analytic engines, as permitted by the subscription, in response to a prescribed increased in queued data samples awaiting cyberthreat analytics and/or (ii) terminate one or more analytic engines in response to a decrease in queued data samples awaiting cyberthreat analytics. The increase and/or decrease may be measured based on the number of objects, rate of change in the increase or decrease, etc. Alternatively, the auto-scaling module may be configured to monitor available queue capacity, where a decrease in available queue capacity denotes increased data samples awaiting analytics and potential addition of analytic engines and an increase in available queue capacity denotes decreased data samples awaiting analytics and potential termination of analytic engine(s).

The subscription billing module is configured to confirm that the subscription parameters have not been exceeded (to denote additional billing) for a time-based, flat-fee subscription (e.g., yearly, monthly, weekly or daily). Alternatively, for a pay-as-you-go subscription, the subscription billing module may be configured to maintain an account of the number of submissions (e.g., data sample submissions) over a prescribed period of time and generate a request for payment from the SaaS subscriber accordingly. Additionally, the subscription billing module may be operable to identify other paid cloud-based services utilized by the SaaS-subscriber for inclusion as part of the payment request. According to one embodiment, the subscription billing module may access the subscriber account data for the requisite information.

According to this embodiment of the disclosure, the object evaluation logic may be separated into multiple evaluation stages, where each evaluation stage is provided access to a queue that features a plurality of queue elements each storing content (object, context information, etc.) associated with a submitted data sample. For this distributed queue architecture, each "stage" queue is provided access to (or receives) content associated with a data sample evaluated in the preceding evaluation stage. Herein, the object evaluation logic includes a preliminary analytic module (within a first evaluation stage), an analytic engine selection module (within a second evaluation stage), a cyberthreat analytic module (within a third evaluation stage), a correlation module (within a fourth evaluation stage) and a post-processing module (within a fifth evaluation stage).

Herein, operating as part of the first evaluation stage, the preliminary analytic module may be configured to conduct one or more preliminary analyses on content within the data sample, which includes the object and/or the context information accompanying the object, in comparison with content associated with accessible cybersecurity intelligence. The cybersecurity intelligence may include context information associated with known malicious objects and known benign objects gathered from prior analytics conducted by the cybersecurity system as well as cybersecurity intelligence from sources external to the cybersecurity system.

Based on analysis of the context information, upon classifying the object as suspicious, the analytic engine selection module is provided access to the object and/or the context information as additional cyberthreat analytics are necessary. Otherwise, responsive to the preliminary analyses determining that the object is malicious or benign, the preliminary analytic module may bypass further cyberthreat analyses of the object.

Operating as part of the second evaluation stage, the analytic engine selection module is configured to determine one or more analytic engines to conduct cyberthreat analytics of the object. This determination may be conducted, at least in part, on the context information accompanying the object. The context information may be categorized as submission context, entitlement context, and/or object context as described below. The analytic engine selection module may select the type of analytic engines (e.g., static analytic engine(s), dynamic analytic engine(s), machine-learning engine(s), and/or emulation analytic engine(s)) based on the context information.

Operating as part of the third evaluation stage, the cyberthreat analytic module includes one or more analytic engines that are directed to different analysis approaches in analyzing an object for malware (and whether it constitutes a cyberthreat). These analytic engines may include any one or combination of the following: (i) static analytic engines; (ii) dynamic analytic engines; (iii) machine learning analytic engines; and/or (iv) emulation analytic engines.

As described herein, the static analytic engines conduct an analysis on the content of the object and generate results including observed features represented by characteristics of the object and context information associated with the object. The context information provides additional information associated with the features (e.g., specific characteristic deemed malicious, location of that characteristic within the object, or the like. The dynamic analytic engines conduct an execution of the object and each generates results including features represented by observed behaviors of the dynamic analytic engine along with context information accompanying the observed features (e.g., software profile, process or thread being executed that generates the malicious features, source object type, etc.). Similarly, machine learning analytic engines submit the object as input into a trained machine-learning model, each generating results including features represented by insights derived from the machine-learning module and accompanying context information, which may be similar to the type of context information provided with dynamic analytic results perhaps along with additional contextual observations learned from objects similar to the object. Lastly, emulation analytic engines conduct reproduction of operations representing the execution of the object, without such execution, which generates results including features represented by behaviors monitored during emulation and its accompanying context information.

According to one embodiment of the disclosure, each analytic engine may feature an analytic engine infrastructure, which includes a health assessment module, a configuration module, an update module, a task processing module and a result processing module. Herein, the health assessment module is configured to determine the operational health of the analytic engine, which may be represented, at least in part, by its utilization level. The configuration module controls the re-configuration of certain functionality of the analytic engine. The update module is configured to receive and control installation of rule changes effecting operability of the task processing module and the result processing module and changes to software profiles (or guest images) to re-configure operability of the analytic engine. The task processing module is further configured to monitor queue elements of the queue that maintain the objects (or data samples) awaiting cyberthreat analytics (i.e., third stage queue) and perhaps queues for the first and/or second evaluation stages to estimate future processing capacity needed. Lastly, the result processing module is responsible for queue management by removing a pending object (or data sample) from the third stage queue and moving the data sample for storage in a fourth stage queue accessible to the correlation module.

Operating as part of the fourth evaluation stage, a correlation module is configured to classify the object included as part of the data sample as malicious, benign, unknown or suspicious based on the above-identified features collected from the analytic results produced by the analytic engines and their accompanying context information. This classification of the object (sometimes referred to as the "verdict") is provided to the post-processing module that is part of the fifth evaluation stage.

Depending on the verdict, the post-processing module may initiate actions to remediate a detected cyberthreat (object). Additionally, or in the alternative, the post-processing module may add certain context information associated with the object to the cybersecurity intelligence utilized by the preliminary analytic module in accordance with a prescribed retention policy maintained by the post-processing module.

The reporting logic is configured to generate a displayable report including the comprehensive results of the cyberthreat analytics (e.g., verdict, observed features and any corresponding meta-information representing the results associated with the cyberthreat analytics, context information associated with the observed features that identify the analyses conducted to produce the observed features, circumstances surrounding the features when observed, etc.). Accessible via the cybersecurity portal, the displayable report may be provided as an interactive screens or series of screens that allow a security administrator (corresponding to a representative of the SaaS-subscriber) to view results of data sample submissions in the aggregate and "drill-down" as to specifics associated with one of the objects uploaded to the cybersecurity system within a data sample submission. The reporting logic may rely on the Subscription ID or a virtual key, which may be part of the data sample submitted to the object evaluation logic, to identify the subscriber and determine a preferred method for conveyance of the alert (and set access controls to preclude access to contents of the alert by other SaaS-subscribers). Additionally, or in the alterative, the reporting logic may generate an alert based on the comprehensive results of the cyberthreat analytics. The alert may be in the form of a message (e.g., "threat warning" text or other electronic message).

II. TERMINOLOGY

In the following description, certain terminology is used to describe aspects of the invention. In certain situations, the terms "logic," "module," and "engine" are representative of hardware, firmware, and/or software that is configured to perform one or more functions. As hardware, the logic (or module or engine) may include circuitry having data processing and/or storage functionality. Examples of such circuitry may include, but are not limited or restricted to a hardware processor, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic (or module or engine) may be software in the form of one or more software modules, which may be configured to operate as its counterpart circuitry. For instance, a software module may be a software instance that operates as a processor, namely a virtual processor whose underlying operations is based on a physical processor such as an EC2 instance within the Amazon® AWS infrastructure for example. Additionally, a software module may include an executable application, a daemon application, an application programming interface (API), a subroutine, a function, a procedure, an applet, a servlet, a routine, source code, a shared library/dynamic load library, or even one or more instructions.

The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or module or engine) may be stored in persistent storage.

The term "computerized" generally represents that any corresponding operations are conducted by hardware in combination with software and/or firmware.

The term "malware" is directed to software that produces an undesirable behavior upon execution, where the behavior is deemed to be "undesirable" based on customer-specific rules, manufacturer-based rules, or any other type of rules formulated by public opinion or a particular governmental or commercial entity. This undesired behavior may include a communication-based anomaly or an execution-based anomaly that (1) alters the functionality of an electronic device executing that software in a malicious manner; (2) alters the functionality of an electronic device executing that software without any malicious intent; and/or (3) provides an unwanted functionality which is generally acceptable in other context.

The term "network device" should be generally construed as physical or virtualized device with data processing capability and/or a capability of connecting to a network, such as a public cloud network (e.g., Amazon Web Service (AWS®), Microsoft Azure®, Google Cloud®, etc.), a private cloud network, or any other network type. The network devices may be used by or a security operations center (SOC), Security Information and Event Management system (SIEM), a network administrator, a forensic analyst, or cybersecurity system for another security provider for communication with an interface (e.g., cybersecurity portal) to access a SaaS-operating cybersecurity system. Examples of a network device may include, but are not limited or restricted to, the following: a server, a router or other intermediary communication device, an endpoint (e.g., a laptop, a smartphone, a tablet, a desktop computer, a netbook, etc.) or virtualized devices being software with the functionality of the network device. The network device may also be deployed as part any physical or virtualized device communicatively coupled via a device interface (e.g., API(s)) for gaining access to the SaaS-operating cybersecurity system.

The term "submission" a type of message (prescribed, structured data format) that is intended to result in a particular task to be performed. The tasks may include object-based analytics (data sample submissions), return of requested information (consumption quota submissions), parameter updates that may influence operations associated with the cyberthreat analytics (parameter adjustment submissions), or the like. With respect to data sample submissions, the submission may include a data sample, namely an organized collection of data including one or more objects and context information at least pertaining to the object(s). An "object" generally refers to a collection of information (e.g., file, document, URL, web content, email message, etc.) that may be extracted from the data sample for cyberthreat analytics.

As described herein, cybersecurity system may be deployed to operate as a subscription-based Security-as-a-Service (SaaS) that utilizes public cloud infrastructure resources, such as virtual computing, virtual data stores, virtual (cloud) database resources for example, provided by an Infrastructure-as-a-Service (IaaS) cloud platform. The cybersecurity system may be configured to operate as a multi-tenant service; namely a service made available to tenants (also referred to as "subscribers") on demand. The IaaS cloud platform may be configured to operate as a multi-tenant service to which a cybersecurity vendor offering the cybersecurity system corresponds to an IaaS-subscriber. Therefore, the cybersecurity system may leverage resources offered by the IaaS cloud platform to support operations conducted by SaaS-subscribers.

The terms "benign," "suspicious" and "malicious" are used to identify different likelihoods of an object being associated with a cyberattack (i.e., constituting a cyberthreat). An object may be classified as "benign" upon determining that the likelihood of the object being associated with a cyberattack is zero or falls below a first threshold (i.e. falls within a first likelihood range). The object may be classified as "malicious" upon determining that the likelihood of the object being associated with a cyberattack is greater than a second threshold extending from a substantial likelihood to absolute certainty (i.e. falls within a third likelihood range). The object may be classified as "suspicious" upon determining that the likelihood of the object being associated with a cyberattack falls between the first threshold and the second threshold (i.e. falls within a second likelihood range). Different embodiments may use different measures of likelihood of malicious and non-maliciousness and may be referenced differently. Therefore, this terminology is merely used to identify different levels of maliciousness.

In certain instances, the terms "compare," comparing," "comparison," or other tenses thereof generally mean determining if a match (e.g., identical or a prescribed level of correlation) is achieved between two items under analysis (e.g., context information, portions of objects, etc.) or representations of the two items (e.g., hash values, checksums, etc.).

The term "transmission medium" generally refers to a physical or logical communication link (or path) between two or more network devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. CYBERSECURITY SYSTEM ARCHITECTURE

Referring to FIG. 1A, a block diagram of an exemplary embodiment of a cybersecurity system 100 operating as a service support by resources hosted by a cloud platform 110 (e.g., infrastructure provided by Microsoft Azure®, Amazon Web Services®, or Google Cloud®) is shown. According to this embodiment, the cybersecurity system 100 operates as a multi-tenant, Security-as-a-Service (SaaS), which is accessible by a plurality of tenants $120_1$-$120_N$ (N≥1) on demand (hereinafter, "subscribers" $120_1$-$120_N$) over a transmission medium 130. Examples of subscribers $120_1$-$120_N$ may include enterprises (companies, partnerships, co-ops, governmental agencies or other agencies, etc.), individuals, or even other cybersecurity vendors that intend to utilize the cybersecurity system 100 to conduct additional analytics on objects submitted to the cybersecurity system 100 in order to obtain a verdict (e.g., malicious or non-malicious determination) for that object or verify a verdict ascertained by another cybersecurity vendor.

The SaaS-operating cybersecurity system 100 may operate in cooperation with the multi-tenant, cloud platform 110, which corresponds to an Infrastructure-as-a-Service (IaaS) cloud platform 110. Hence, multiple subscribers $120_1$-$120_N$ may be provided controlled access to cybersecurity services offered by the SaaS-operating cybersecurity system 100 while multiple users (e.g., two or more IaaS subscribers, including the SaaS-operating cybersecurity system 100 as shown and other IaaS subscriber 102), may be provided controlled access to shared resources hosted by the IaaS cloud platform 110 (hereinafter, "public cloud infrastructure resources 150"). For example, the SaaS 100 may deploy a vendor-specific proprietary software stack to run on the resources 150 (e.g., compute and storage resources) provided by the IaaS cloud platform 110. According to this embodiment, the SaaS-operating cybersecurity system 100 is controlled by a different entity than the IaaS cloud provider.

Based on the dual multi-tenant deployment, the SaaS-operating cybersecurity system 100 may be configured to charge usage of the SaaS in accordance with a different parameters (and pricing scheme) than offered by the IaaS (public cloud). For example, the SaaS-operating cybersecurity system 100 may be configured with subscription tier pricing based on the number of submissions with objects provided to undergo cyberthreat analytics by the SaaS-operating cybersecurity system 100 (e.g., number of objects uploaded via a portal or other type of interface) or the number of objects processed (e.g., to account for objects included as part of one or more submissions and additional objects processed that were produced during the processing of another object).

This SaaS-IaaS deployment enables both the customer and cybersecurity vendor to avoid significant capital outlays in buying and operating physical servers and other datacenter infrastructure. Rather, the cybersecurity vendor incurs the costs associated with the actual use of certain public cloud infrastructure resources 150 in the aggregate, such as IaaS-based storage amounts or compute time for analytic engines formed from IaaS-based computing instances. The subscribers incur the costs associated with their actual number of submissions (e.g., data sample submissions described below) input into the SaaS-operating cybersecurity system 100.

Figure 1B:
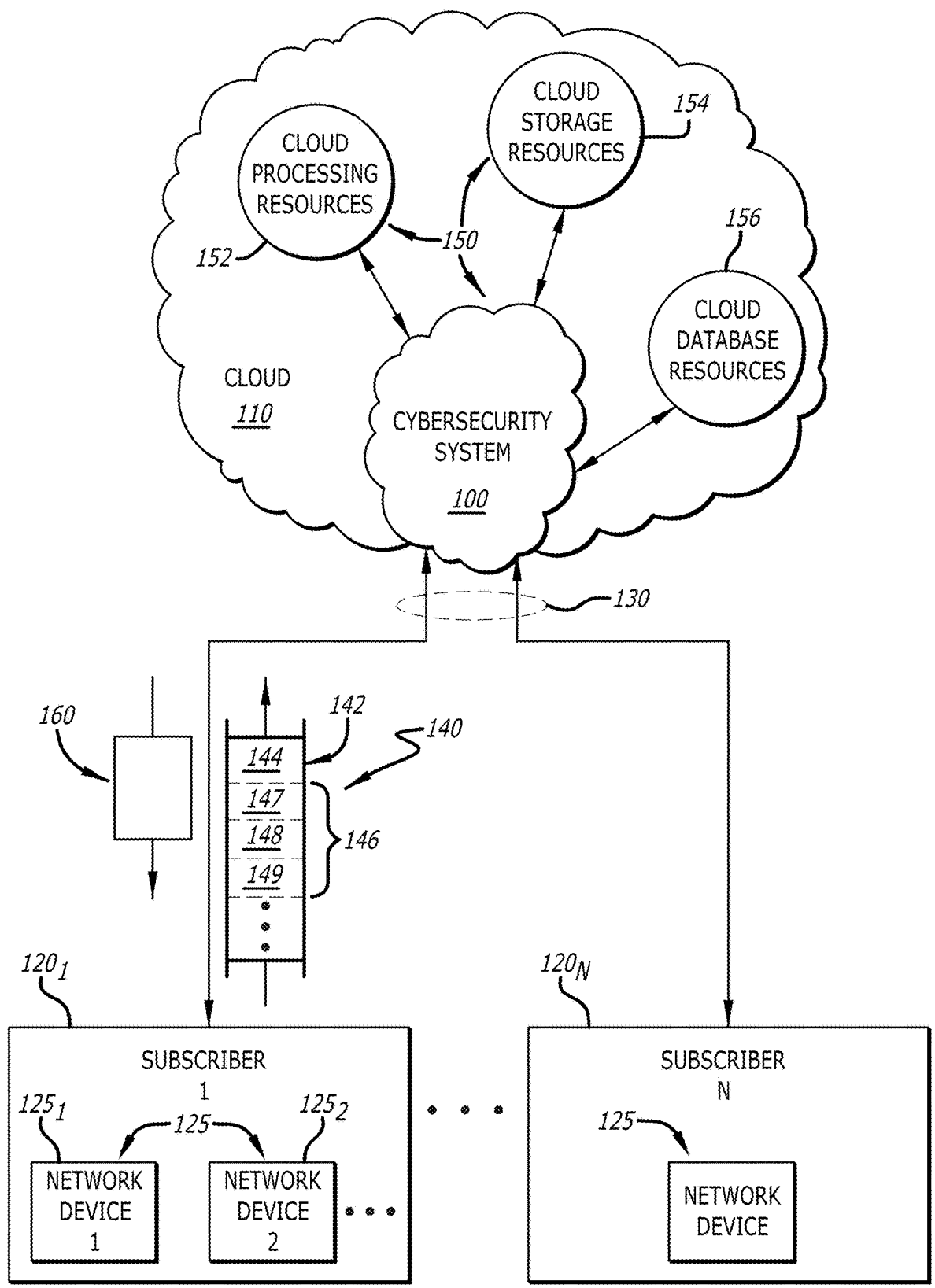
FIG. 1B is a block diagram of an exemplary embodiment of a cloud-based cybersecurity system deployed as a cybersecurity service within a cloud network.

Referring to FIG. 1B, a block diagram of an exemplary embodiment of the SaaS-operating cybersecurity system 100 leveraging the public cloud infrastructure resource 150 provided by the IaaS cloud platform (referred to as "public cloud") 110 is shown. For this embodiment, the cybersecurity system 100 is configured to operate as a multi-tenant, subscription-based SaaS; namely, a cloud-based subscription service that utilizes storage and compute services hosted by the public cloud 110 and is available to the plurality of subscribers $120_1$-$120_N$ over the transmission medium 130 including a public network (e.g., Internet).

As shown, according to one embodiment of the disclosure, each subscriber (e.g., subscriber $120_1$ ..., or subscriber $120_N$ as shown) may include one or more network devices 125, where each of the network devices 125 may be permitted access to the cybersecurity system 100 if credentials submitted by that network device 125 are authenticated. According to one embodiment of the disclosure, the credential authentication may be conducted in accordance with a credential (key) authentication scheme in which a (virtual) key generated by the cybersecurity system 100 and provided to a subscriber (e.g., subscriber $120_N$) is used to gain access to the cybersecurity system 100. Herein, the network devices 125 may be used by different sources, including but not limited or restricted to a security operations center (SOC), a Security Information and Event Management system (SIEM), a network administrator, a forensic analyst, a different cybersecurity vendor, or any other source seeking cybersecurity services offered by the cybersecurity system 100.

Herein, the cybersecurity system 100 is logic that leverages public cloud infrastructure resources 150. In particular, the logic associated with the cybersecurity system 100 may be stored within cloud-based storage resources (e.g., virtual data stores corresponding to a physical, non-transitory storage medium provided by the public cloud 110 such as Amazon® S3 storage instances, Amazon® Glacier or other AWS Storage Services). This stored logic is executed, at least in part, by cloud processing resources (e.g., one or more computing instances operating as virtual processors whose underlying operations are based on physical processors, such as EC2 instances within the Amazon® AWS infrastructure). As additional storage and/or processing capabilities are required, the cybersecurity system 100 may request and active additional cloud processing resources 152 and cloud storage resources 154.

According to this embodiment of the disclosure, the cybersecurity system 100 is configured to receive and respond to messages 140 requesting one or more tasks to be conducted by the cybersecurity system 100 (hereinafter referred to as "submissions"). One of these submissions 140 may include a data sample 142, where the data sample submission 140 requests the cybersecurity system 100 to conduct analytics on an object 144 included as part of the data sample 142. Context information 146 pertaining to the object 144 may be included as part of the data sample 142 or part of the submission 140.

According to one embodiment of the disclosure, the context information 146 may include different context types such as context information 147 associated with the data sample submission 140 (submission context 147), context information 148 associated with entitlements associated with a subscription to which the submitting source belongs (entitlement context 148), and/or context information 149 associated with the object 144 (object context 149). The context information 146 is not static for the object 144 at the time of submission. Rather, the context information 146 may be modified (augmented) based on operations within the cybersecurity system 100, especially entitlement context 148 obtained from a subscriber's account. Herein, the context information 146 may be used to identify the subscriber $120_1$ responsible for submitting the data sample 142.

As described above, the cybersecurity system 100 may leverage the public cloud infrastructure resources 150 hosted by the public cloud 110. As described above, the public cloud infrastructure resources 150 may include, but are not limited or restricted to cloud processing resources 152 (e.g., computing instances, etc.) and cloud storage resources 154 (e.g., virtual data stores operating as non-volatile or volatile storage such as a log, queues, etc.), which may be allocated for use among the subscribers $120_1$-$120_N$. By leveraging the infrastructure of the public cloud 110, the cybersecurity system 100 is able to immediately "scale up" (add additional analytic engines, as permitted by the subscription) or "scale down" (terminate one or more analytic engines) its cloud resource usage when such usage exceeds or falls below certain monitored thresholds.

As an illustrative example, the cybersecurity system 100 may monitor capacity levels of virtual data stores operating as queues that provide temporary storage at certain stages during analytics of the object 144 (hereafter, "queue capacity"). The queue capacity may be determined through any number of metrics, such as the number of queued objects awaiting analytics, usage percentages of the queues, computed queue wait time per data sample, or the like. Hence, the cybersecurity system 100 may scale up its usage of any public cloud infrastructure resources 150, such as cloud processing resource 152 being customized to operate as analytic engines as described below, upon exceeding a first threshold, perhaps for a prolonged period of time to avoid throttling. Similarly, the cybersecurity system 100 may scale down its usage of the cloud processing resource 152 upon falling below a second threshold, perhaps for the prolonged period of time as well.

Also, the cybersecurity system 100 may utilize the public cloud infrastructure resources 150 for supporting administrative tasks. As an illustrative example, the cybersecurity system 100 may be allocated cloud storage resources 152 for maintaining data for use in monitoring compliance by the subscribers $120_1$-$120_N$ with their subscription entitlements. The subscription entitlements may be represented as permissions such as (i) a maximum number of submissions over a prescribed period of time (e.g., subscription time period, yearly, monthly, weekly, daily, during certain hours, etc.), (ii) a maximum number of active virtual keys providing authorized access to the cybersecurity system 100, (iii) additional capabilities as provided by enhancements made available based on the selected subscriber tier, or the like.

The cybersecurity system 100 supports bidirectional communications with the subscribers $120_1$-$120_N$ in which one or more responses 160 to the submissions 140 are returned to the subscribers $120_1$-$120_N$. For example, in response to the data sample submission 140 provided from a network device $125_1$ of the first subscriber $120_1$, the response 160 may correspond to a displayable report 160 including comprehensive results of cyberthreat analytics conducted on the object 144 and its accompanying context information 146. Examples of the comprehensive results may include a verdict, observed features and any corresponding meta-information representing the results associated with the cyberthreat analytics, and context information associated with the observed features (e.g., information that identifies the analyses conducted to produce the observed features, circumstances the features occurred, etc.). Additionally, or in the alterative, the response 160 may include one or more alert messages (hereinafter, "alert message(s)"). The alert message(s) may include a portion of the comprehensive results of cyberthreat analytics, such as verdict and name of the object 144.

Figure 2:
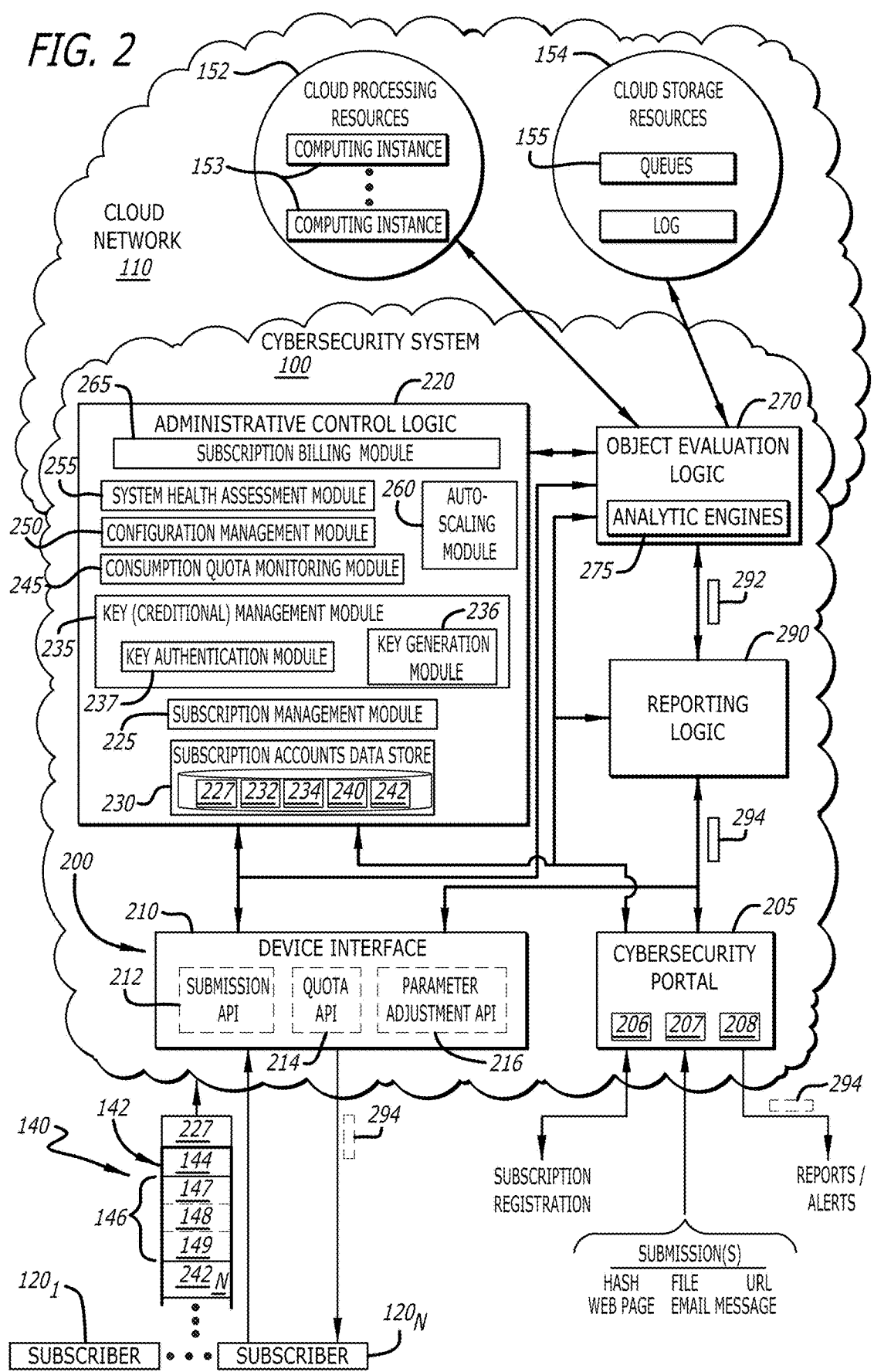
FIG. 2 is a block diagram of an exemplary embodiment of logic forming the cybersecurity system of FIGS. 1A-1B.

Referring now to FIG. 2, a block diagram of an exemplary embodiment of logic forming the cybersecurity system 100 of FIG. 1B is shown, wherein the logic relies upon the public cloud infrastructure resources 150 and monitors accesses to the cybersecurity system 100 for subscription compliance, billing and reporting. Herein, the cybersecurity system 100 features interface logic 200, administrative control logic 220, object evaluation logic 270, and reporting logic 290.

As shown, according to this embodiment of the disclosure, based on the type of submission, the interface logic 200 enables communications with different modules forming the administrative control logic 220. Upon validation of the submission 140, authentication of a subscriber (e.g., subscriber $120_N$) providing the submission 140 and verification that the subscriber $120_N$ is authorized to perform the task or tasks associated with the submission 140, the task(s) associated with the submission 140 is (are) performed.

According to one embodiment of the disclosure, as shown in FIG. 2, the interface logic 200 includes a cybersecurity portal 205 that allows any user (potential subscriber) to register and establish a subscription with the cybersecurity system 100. After the subscription is established, the user (referred to as the "subscriber") may be provided with additional accessibility to the cybersecurity system 100 via device interface 210 corresponding to logic supporting one or more APIs, where different combinations of APIs may be provided depending on the terms of the subscription. For example, where the submission 140 corresponds to a data sample submission, logic associated with an API of the device interface 210 may be configured to await for the validation of the data sample submission 140, authentication of the subscriber 120$_N$ submitting the data sample submission 140 and verification that the subscriber 120$_N$ is authorized to submit at least the data sample 142 for cyberthreat analytics before routing the data sample 142 to the object evaluation logic 270. The device interface 210 supports automated network device 125 to cybersecurity system 100 communications. However, the cybersecurity portal 205 supports all submission types.

More specifically, according to one embodiment of the disclosure, as shown in FIG. 2, the device interface 210, when deployed, include a first API 212, a second API 214 and/or a third API 216. In particular, as an illustrative embodiment, the device interface 210 may include the first API 212 that provides an interface for the submission of the object 144 for cyberthreat analytics (in the form of the data sample submission 140 featuring the data sample 142, which may include the object 144 and/or its context information 146). The administrative control logic 220 is configured to validate the data sample submission 140, authenticate the subscriber 120$_N$ submitting the data sample 142, verify that the submission of the data sample 142 is in compliance with parameters associated with the subscriber's subscription, and thereafter, provide at least a portion of the data sample 142 (e.g., object, context information) to the object evaluation logic 270 for analysis.

The second API 214 provides an interface for submissions directed to subscription management such as ascertain SaaS-based metrics associated with a current state of a subscription. These SaaS metrics may include object submission quota (e.g., number of objects submitted during the subscription period, number of objects available for submission during the remainder of the subscription period, etc.). The third API 216 provides an interface for submissions to parameters and other information to a configuration management module 250 within the administrative control logic 220 to enable subscriber 120$_N$, via the device interface 210, to specify parameters that control operability of the cyberthreat analytics.

Alternative, the cybersecurity portal 205 features logic, namely the first logic 206, second logic 207 and third logic 208 of the cybersecurity portal 205, that correspond in operation to the first API 212, the second API 214 and the third API 216, respectively. These logic units support the handling of the submissions through the cybersecurity portal 205 in a manner similar to the APIs of the device interface 210, as described above.

Referring still to FIG. 2, an embodiment of modules deployed within the administrative control logic 220 is shown. Herein, the administrative control logic 220 includes a plurality of modules that collectively operate to receive and validate the submission 140, authenticate the subscriber 120$_N$ operating as the source of the submission 140, and verify that the subscriber 120$_N$ is authorized to conduct the task associated with the submission 140. The verification may involve the credential (key) management module 235 confirming that the subscriber's subscription permits the handling of the task and the SaaS metrics associated with the current state of the subscriber's subscription do not preclude the handling of the task and/or metrics of the current state of submission (e.g., data sample submission threshold reached, etc.). The above-identified modules of the administrative control logic 220 may include, but are not limited or restricted to the subscription management module 225, a subscriber accounts data store 230, the credential (key) management module 235, a consumption quota monitoring module 245, the configuration management module 250, a system health assessment module 255, an auto-scaling module 260, and a subscription billing module 265.

The subscription management module 225 is configured to control access, via the cybersecurity portal 205, to the cybersecurity system 100 by controlling the subscription onboarding process. Via the cybersecurity portal 205, during the onboarding process to register with and gain access to the cybersecurity system 100, the subscription management module 225 gathers subscriber information (e.g., name of company, business address, industry by sector, geographic location, representative contact information, etc.) and financial information associated with the subscriber (e.g., bank account information, credit card information, etc.). The subscription management module 225 further prompts the subscriber, for example subscriber 120$_N$, for selection of a particular subscription tier. Each subscription tier may provide different types and/or levels of entitlements (e.g., access privileges, subscription parameters such as data sample submission thresholds, virtual key allocation threshold, etc.), where the usage or allocation of such entitlements may be monitored.

For instance, as an illustrative example, the subscription tiers may be based on different data sample submission thresholds for a prescribed period of time (e.g., a first subscription tier with one million data sample submissions per year (up to 1M/year) at cost $X and a second "pay-as-you-go" subscription tier with unlimited data sample submissions but higher submission costs per sample, $X+$Y). Additionally, or in the alternative, the subscription tiers may be based on the numbers of credentials (e.g., keys, tokens, etc.) made available to the subscriber 120$_N$ (e.g., prescribed number of active virtual keys allocated to the subscriber 120$_N$ for subscriber/device authentication), or the like.

Additionally, the subscription management module 225 may assign the Subscription ID 227 to the subscriber 120$_N$. Herein, the Subscription ID 227 may be relied upon to assist in accessing account data associated with a particular subscription selected by the subscriber 120$_N$, which is maintained within the subscriber accounts data store 230.

The subscriber accounts data store 230 constitutes a data store that is configured to maintain a record of account data associated with each subscriber 120$_1$-120$_N$ registered to access cybersecurity services provided by the cybersecurity system 100. According to one embodiment of the disclosure, the subscriber accounts data store 230 may be configured as (i) one or more virtual data stores (e.g., Amazon® S3 data stores) each maintaining a record of the account data for a particular subscriber and utilized in the aggregate by the IaaS subscriber (cybersecurity vendor), (ii) one or more virtual data stores maintaining a collection of references (e.g., links, etc.), each directed to a different portion of cloud-based storage including account data maintained by public cloud infrastructure resources such as cloud (Amazon®) database resources 156 of FIG. 1B, which is maintained in the aggregate for the IaaS subscriber (cybersecurity vendor), but allocated separately by the cybersecurity system 100 to different SaaS subscribers (e.g., subscribers 120$_1$-120$_N$), or (iii) a hybrid deployment where the storage of credentials and/or personal identifiable information may be included in the virtual data store(s) along with references to the remainder of the account data maintained by the cloud database resources 156.

The "account data" may include any information or meta-information (e.g., Subscription ID 227, credentials 240/242 such as tokens, keys or representatives thereof, metrics 232/234) that may be used to identify or authenticate its subscriber, provide subscription status or expiration date, and/or verify that a task associated with a submission may be handled by confirming compliance with entitlements provided by the subscriber-selected subscription tier. According to one embodiment of the disclosure, each subscriber account may be located using the Subscription ID 227 and/or credentials 242 (e.g., content (or derivative thereof) may be used to locate a location in a virtual data store for account data associated with that subscriber) and is configured to include information associated with the subscriber and subscription entitlements (e.g., which APIs accessible by that subscriber; maximum number of submissions during a select time period, maximum number of issued virtual keys, etc.).

According to one embodiment of the disclosure, the subscriber accounts data store 230 may be configured to monitor and maintain, on a per subscriber basis, metrics including SaaS metrics 232 (representing at least some of the subscription entitlements) and IaaS metrics 234. The SaaS metrics 232 may include metrics that represent and maintain a sum total of submissions made by the (SaaS) subscriber $120_N$ (e.g., sum total of data sample submissions) made during a particular period of time (e.g., subscription time period), which may be accessed to confirm that the sum total falls below the maximum number of submissions to ensure compliance with the subscription entitlements, especially before an incoming data sample submission is provided to the object evaluation logic 270. The SaaS metrics 232 may further include metrics that represent and maintain a sum total of virtual keys currently issued to the SaaS subscriber $120_N$. The SaaS metrics 232 may be used for billing of the subscriber $120_N$ based on the number of data sample submissions made during the particular period of time, and in some cases, to ensure compliance with subscription entitlements.

Besides subscriber-specific metrics, the SaaS metrics 232 may aggregation metrics directed to all SaaS subscribers. For example, the SaaS metrics 232 may include an aggregate as to the number of data sample submissions for all SaaS subscribers. This metric may be used to determine the profitability of the cybersecurity system 100 to determine whether the cost structure necessities a change in submission pricing.

As an alternative (and optional) embodiment, the cybersecurity system 100 may be configured to monitor and maintain, on a per subscriber basis, IaaS metrics 234. The IaaS metrics 234 may include, inter alia, information that quantifies certain resource usage by the SaaS subscriber $120_N$, which may be directed to subscription compliance or certain advanced features provided by the cybersecurity system (e.g., indicator of compromise "IOC" generation, use of forensic analysts, etc.) that may involve ancillary services hosted by the public cloud 110. For example, the IaaS metrics 234 may conduct subscribed-based monitoring of public cloud infrastructure resources 150 (i.e., resources hosted by the public cloud network) to ensure compliance with certain subscription entitlements such as a quality of service (QOS) thresholds influenced by the number of computing instances used by the subscriber concurrently (e.g., at least partially overlapping in time), a maximum amount of cloud-based storage memory allocated, or the like.

As further shown in FIG. 2, the credential (key) management module 235 features a credential (key) generation module 236 configured to handle credential generation and a credential (key) authentication module 237 configured to handle subscriber authentication. In particular, upon notification from the subscription management module 225 that the subscription process for the subscriber $120_N$ has successfully completed, the key generation module 236 generates a first (primary) credential 240 (referred to as a "master key") assigned to the subscriber $120_N$ associated with the subscription. According to one embodiment of the invention, the master key 240 may be maintained within a portion of the subscriber accounts data store 230 allocated to the subscriber $120_N$, and it is not provided to the subscriber $120_N$. Instead, the master key 240 may operate as a basis (e.g., seed keying material) used by the credential generation module 236 to generate one or more second credentials 242 (referred to as "virtual keys"). A virtual key 242 may be included as part of a submission (e.g., data sample, quota, parameter adjustment) and used by the credential management module 235 in authenticating the subscriber $120_N$ and confirming that the subscriber $120_N$ is authorized to perform a task associated with the submission accompanied by the virtual key 242.

In particular, after the subscription registration process has completed, the key management module 235 may receive a virtual key generation request from a subscriber (e.g., the subscriber $120_N$). Upon receipt of the virtual key generation request, the key management module 235 confirms that the generation and release of the requested number of virtual keys is in compliance with the subscription entitlements (e.g., maximum number of issued (active) virtual keys available to the subscriber $120_N$). If the generation of the virtual keys is in compliance with the subscription parameters, the key generation module 236 generates and returns requested virtual keys 242 to the subscriber $120_N$. Additionally, as shown in FIG. 2, the key management module 235 stores the generated virtual keys 242 within the subscriber accounts data store 230 as part of the account data for the subscriber $120_N$.

Furthermore, the key authentication module 237 is configured to authenticate the subscriber $120_N$ upon uploading the submission 140 (e.g., data sample submission, quota submission, parameter adjustment submission) and confirm that the task associated with the submission 140 is in compliance with the subscription entitlements afforded to the subscriber $120_N$. More specifically, while the data sample submission 140 (inclusive of one of the virtual keys 242 (represented as virtual key $242_N$) along with an object selected for analysis, corresponding context information, and optionally the Subscription ID 227) is submitted to the cybersecurity system 100 via the interface logic 200 (e.g., first API 212 or optionally cybersecurity portal 205), content from the data sample submission 140 (e.g., object 144, portions of the context information 146, etc.) may be withheld from being provided to the key management module 235.

Using the virtual keys $242_N$ (or Subscription ID), the key management module 235 may determine a location of the account data associated with the subscriber $120_N$ within the subscription accounts data store 230 to validate the virtual key $242_N$, thereby authenticating the subscriber $120_N$. Additionally, the key management module 235 may conduct an analysis of certain context information 146 provided with the data sample submission 140 to confirm, based on the subscription entitlements and the SaaS metrics 232 associated with data sample submissions, whether the data sample submission 140 may be submitted to the object evaluation logic 270. In this case, provided that the subscriber 120$_N$ has been authenticated and given authority to perform the task associated with the data sample submission 140 has been verified, the key management module 235 returns a message, which prompts the interface logic 200 to at least route the data sample 142 (and perhaps other content within the data sample submission 140) to the object evaluation logic 270. Otherwise, the key management module 235 returns an error code, which prompts the interface logic 200 to notify the subscriber 120$_N$ of a submission error consistent with the error code.

Referring still to FIG. 2, consumption quota monitoring module 245 may be accessed through the second API 214 (or via the cybersecurity portal 205 and is configured to enable a subscriber (e.g., the subscriber 120$_N$) to obtain metrics associated with the current state of the subscription (e.g., active status, number of submissions for a particular submission type (or in total) conducted during the subscription period, number of submissions remaining for the subscription period, etc.). For instance, as an illustrative example, the consumption quota monitoring module 245 may receive a message (quota request submission) from any of the subscribers 120$_1$-120$_N$ (e.g., subscriber 120$_N$) via the interface logic 200, such as the second API 214 of the device interface 210 (or optionally logic 207 of the cybersecurity portal 205 for example). Upon receipt of the quota request submission (after virtual key 242$_N$ included as part of the quota request submission has been extracted by the credential management module 235 to authenticate the subscriber 120$_N$ and the subscriber 120$_N$ is authorized to perform this task based on the subscription entitlements), the consumption quota monitoring module 245 may be configured to establish communications with the subscriber accounts data store 230. Upon establishing communications, the consumption quota monitoring module 245 may access various metrics associated with the SaaS metrics 232, such as the subscription status (active/inactive) and/or the sum total of submissions (or data sample submission in particular) made during a selected time period.

Optionally, depending on the logical configuration of the administrative control logic 220, the consumption quota monitoring module 245 may be accessed by the key management module 235 to confirm that a requested task is in compliance with the subscription entitlements. For example, responsive to a data sample submission being a task of conducting analytics on a submitted data sample, the credential management module 235 may be configured to access the consumption quota monitoring module 245 to confirm compliance with the subscription entitlements (e.g., maximum number of data sample submissions constituting the data sample submission threshold has not been exceeded) before task is initiated (e.g., data sample 142 is provided to the object evaluation logic 270 for cyberthreat analytics).

The configuration management module 250 is configured to enable a subscriber, via the third API 216 (or optionally the cybersecurity portal 205), to specify parameters that control operability of the cyberthreat analytics. For instance, prior to controlling such operability, the credential management module 235, upon receipt of a parameter adjustment submission, may extract a virtual key included as part of the submission to authenticate the subscriber 120$_N$ and verify that the subscriber is authorized to perform this task (cyberthreat analytics configuration). Thereafter, contents of the parameter adjustment submission are routed to the configuration management module 250, which may alter stored parameters that may influence workflow, such as (i) operations of an analytic engine selection module deployed within the object evaluation logic 270 of the cybersecurity system 100 for selection of analytic engines (e.g., priority of analytics, change of analytics based on subscriber or attack vectors targeting subscriber's industry, etc.), (ii) operations of the analytic engines deployed within the object evaluation logic 270 (e.g., changes in parameters that effect operations of the engines (e.g., available software profile(s) or guest images, run-time duration, priority in order of cyberthreat analytics, etc.), and/or (iii) operations of the correlation module deployed within the object evaluation logic 270 (e.g., changes to threshold parameters relied upon to issue a threat verdict, etc.) and/or (iv) operations of the post-processing module deployed within the object evaluation logic 270 (e.g., change of retention time periods for context information associated with benign or malicious objects within cybersecurity intelligence, etc.).

The system health assessment module 255 and the auto-scaling module 260 are in communications with various modules within the object evaluation logic 270 and SaaS subscribers have no visibility as to the operability of these modules. Herein, the system health assessment module 255 is configured to monitor queue storage levels and/or the health (e.g., operating state, capacity level, etc.) of the public cloud infrastructure resources 150, notably the analytic engines 275 utilized by the object evaluation logic 270 to conduct cybersecurity analytics on submitted data samples. From these communications, the system health assessment module 255 may be configured to ascertain the overall health of the object evaluation logic 270. Additionally, the system health assessment module 255 may be configured to monitor the operability of certain public cloud infrastructure resources 150 utilized by the administrative control logic 220, the reporting logic 290 and even logic associated with the interface logic 200 to surmise the overall health of the cybersecurity system 100.

The auto-scaling module 260 may be configured to select and modify one or more additional computing instances 153 forming the basis for one or more analytic engines 275 within the object evaluation logic 270. In particular, the auto-scaling module 260 is configured to add additional analytic engines, as permitted by the subscription, in response to a prescribed increased in queued content associated with objects (or data samples) awaiting cyberthreat analytics (e.g., increased level of occupancy of content associated with the data sample within queuing elements being part of the distributed queues 155 hosted as part of the cloud storage resources 154 and responsible for temporarily storing data samples awaiting processing by the analytic engines 275). Additionally, the auto-scaling module 260 is configured to terminate one or more analytic engines in response to a decrease in queued data samples awaiting cyberthreat analytics. The increase and/or decrease may be measured based on the number of objects, rate of change (increase or decrease), etc.

Alternatively, the auto-scaling module 260 may be configured to monitor available queue capacity, where a decrease in available queue capacity denotes increased data samples awaiting analytics and potential addition of analytic engines and an increase in available queue capacity denotes decreased data samples awaiting analytics and potential termination of analytic engine(s). The prescribed decrease in available queue capacity may be measured based on a prescribed rate of change of available capacity for one or more queues, being part of the distributed queues 155 hosted as part of the cloud storage resources 154 and responsible for temporarily storing data samples awaiting processing by the analytic engines 275, a decrease in the amount of storage available beyond a first prescribed threshold for the queue(s), or a decrease in the percentage of storage available for the queue(s). Similarly, the auto-scaling module 260 may be configured to terminate one or more of the computing instances operating as the analytic engines 275 in response to an increase in available queue capacity beyond a second prescribed threshold. The first and second thresholds may be storage thresholds (e.g., number of data samples, percentage of storage capacity, etc.) in which the first threshold differs from the second threshold.

The subscription billing module 265 is configured to confirm that the subscription parameters have not been exceeded (to denote additional billing) for a time-based, flat-fee subscription (e.g., yearly, monthly, weekly or daily). Alternatively, for a pay-as-you-go subscription, the subscription billing module 265 may be configured to maintain an account of the number of submissions analyzed by the object evaluation logic 270 (e.g., data sample submissions) over a prescribed period of time and generate a request for payment from a SaaS subscriber (e.g., subscriber $120_N$) accordingly. The number of data sample submissions include those submitted from the subscriber $120_N$, and according to some embodiments, may include additional objects uncovered during analytics during the subscription period. Additionally, the subscription billing module 265 may be operable to identify other paid cloud-based services utilized by the SaaS-subscriber $120_N$ for inclusion as part of the payment request. According to one embodiment, the subscription billing module 265 may access the subscriber account data for the requisite information.

Referring still to FIG. 2, the object evaluation logic 270 is configured to receive data samples via the interface logic 200 and conduct cyberthreat analyses on these data sample. The object evaluation logic may be separated into multiple evaluation stages, where each evaluation stage is provided access to a queue that features a plurality of queue elements each storing content (object, context information, etc.) associated with a submitted data sample. For this distributed queue architecture, each "stage" queue is provided access to (or receives) content associated with a data sample evaluated in the preceding evaluation stage. Herein, the object evaluation logic includes a preliminary analytic module (within a first evaluation stage), an analytic engine selection module (within a second evaluation stage), a cyberthreat analytic module (within a third evaluation stage), a correlation module (within a fourth evaluation stage) and a post-processing module (within a fifth evaluation stage). As illustrated by a bidirectional arrow, the object evaluation logic 270 is configured with logic to communicate with the administrative control logic 220 to exchange or return information, such as subscription-related information (e.g., number of processed objects, health information, queue capacity, etc.) that may be used for billing, auto-scaling and other operability provided by the cybersecurity system 100.

The reporting logic 290 is configured to receive meta-information 292 associated with the analytic results produced by the object evaluation logic 270 and generate a displayable report 294 including the comprehensive results of the cyberthreat analytics (e.g., verdict, observed features and any corresponding meta-information representing the results associated with the cyberthreat analytics, context information associated with the observed features that identify the analyses conducted to produce the observed features, circumstances the features occurred, etc.). Accessible by the subscriber $120_N$ via the cybersecurity portal 205, the displayable report 294 may be provided as one or more interactive screens or a series of screens that allow a security administrator (corresponding to a representative of the SaaS-subscriber) to view results of data sample submissions in the aggregate and "drill-down" as to specifics associated with one of the objects uploaded to the cybersecurity system within a data sample submission. The reporting logic 290 may rely on the Subscription ID 227 or the virtual key $242_N$, which may be part of the data sample 144 submitted to the object evaluation logic 270, to identify the subscriber $120_N$ and determine a preferred method for conveyance of an alert of the presence of the displayable report 294 (and set access controls to preclude access to contents of the displayable report 294 by other SaaS-subscribers). Additionally, or in the alterative, the reporting logic 290 may generate an alert based on the comprehensive results of the cyberthreat analytics. The alert may be in the form of a message (e.g., "threat warning" text or other electronic message).

Figure 3:
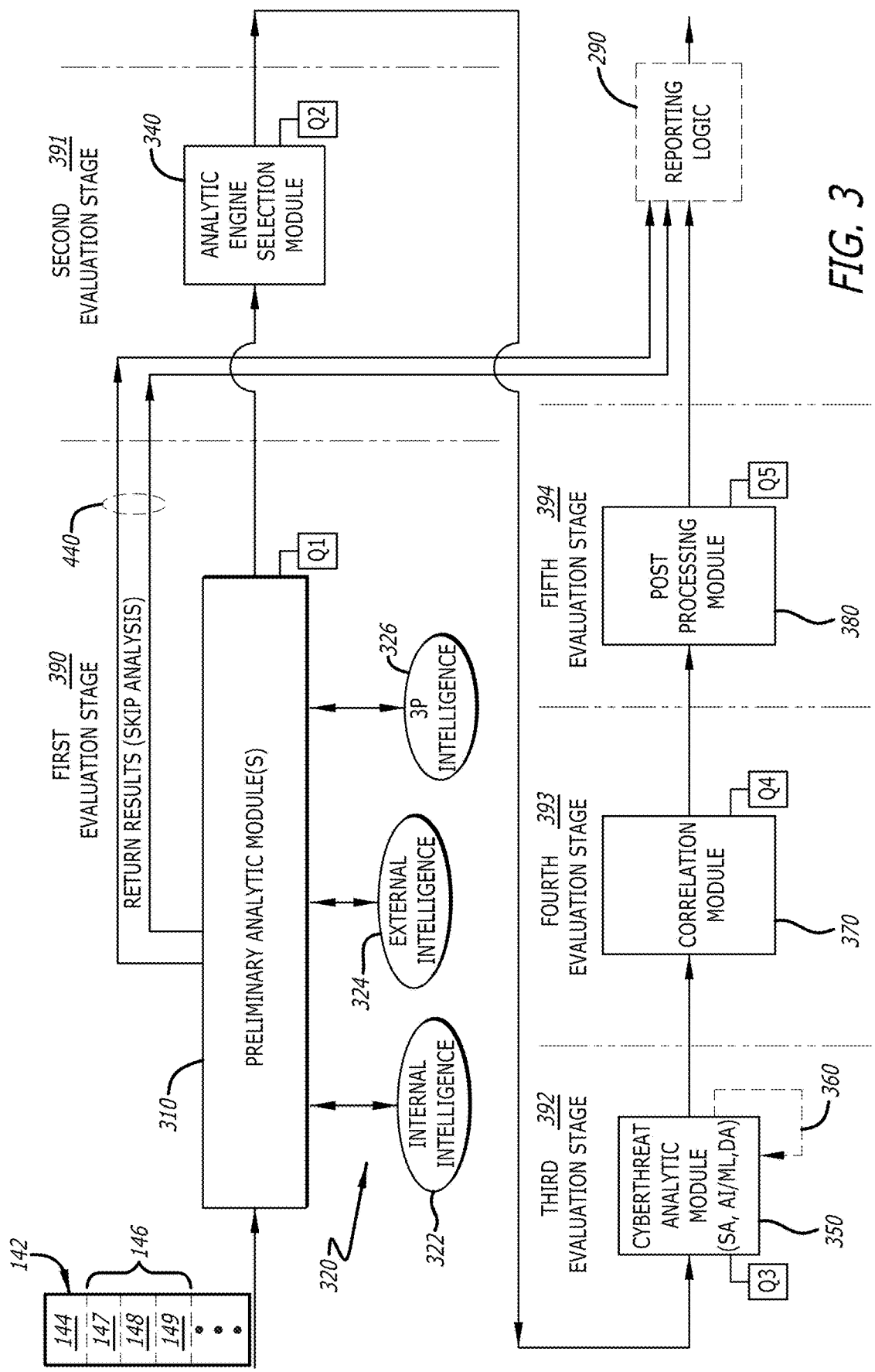
FIG. 3 is a block diagram of an exemplary embodiment of a multi-stage object evaluation logic implemented within the cybersecurity system of FIG. 2.

Referring to FIG. 3, a block diagram of an exemplary embodiment of the object evaluation logic 270 implemented within the cybersecurity system 100 of FIG. 2 is shown. According to this embodiment of the disclosure, the object evaluation logic 270 may be separated into multiple evaluation stages 390-394, where each evaluation stage 390 . . . or 394 is assigned a queue including a plurality of queue elements to store content associated with the data sample 144 as it proceeds through the evaluation stages 390-394 along with context information generated as analytics is performed on the data sample 142. The queues associated with the evaluation stages 390-394 are illustrated in FIG. 3 as Q1-Q5. Herein, the object evaluation logic 270 includes a preliminary analytic module 310 (within the first evaluation stage 390), an analytic engine selection module 340 (within the second evaluation stage 391), a cyberthreat analytic module 350 (within the third evaluation stage 392), a correlation module 370 (within the fourth evaluation stage 393) and a post-processing module 380 (within the fifth evaluation stage 394).

Herein, the object evaluation logic 270 receives content from the data sample 142, such as an object 144 for analysis along with context information 146 associated with the object 144. More specifically, according to one embodiment of the disclosure, the context information 146 may include submission context 147, entitlement context 148, and/or object context 149. The submission context 147 may include information pertaining to the submission 140 and/or data sample 142, such as (i) time of receipt or upload into the cybersecurity system 100, (ii) origin of the object 144 included in the submission 140 (e.g., from email, network cloud shared drive, network transmission medium, etc.), location of the subscriber device $120_N$ submitting the object 144, Internet Protocol (IP) address of the subscriber device $120_N$, or the like. The entitlement context 148 may include information pertaining to the subscription selected by the subscriber, such as information directed to what features are permitted by the subscription (e.g., types of analytics supported, reporting formats available, credentials to access third party resources, or other features may distinguish different subscription tiers. Lastly, the object context 149 may include information pertaining to the object 144, including meta-information associated with the object 144 such as the name of the object 144, an extension type (e.g., pdf, exe, html, etc.), or the like.

The preliminary analytic module 310 is configured to conduct one or more preliminary analyses on content within the data sample 142, which includes the object 144 and/or the context information 146 accompanying the object 144, based on cybersecurity intelligence 320 accessible to the object evaluation logic 270. The cybersecurity intelligence 320 may include context information 322 associated with known malicious objects and known benign objects gathered from prior analytics conducted by the cybersecurity system 100 (hereinafter, "internal intelligence 322"). Additionally, or in the alternative, the cybersecurity intelligence 320 may include context information 324 (hereinafter, "external intelligence") 324 associated with known malicious objects and known benign objects gathered from analytics conducted by other cybersecurity intelligence sources (e.g., other cloud-based cybersecurity systems, on-premises cybersecurity systems, etc.) and/or context information 326 associated known malicious and/or benign objects accessible from one or more third party cybersecurity sources (hereinafter, "3P intelligence 326").

Figure 4:
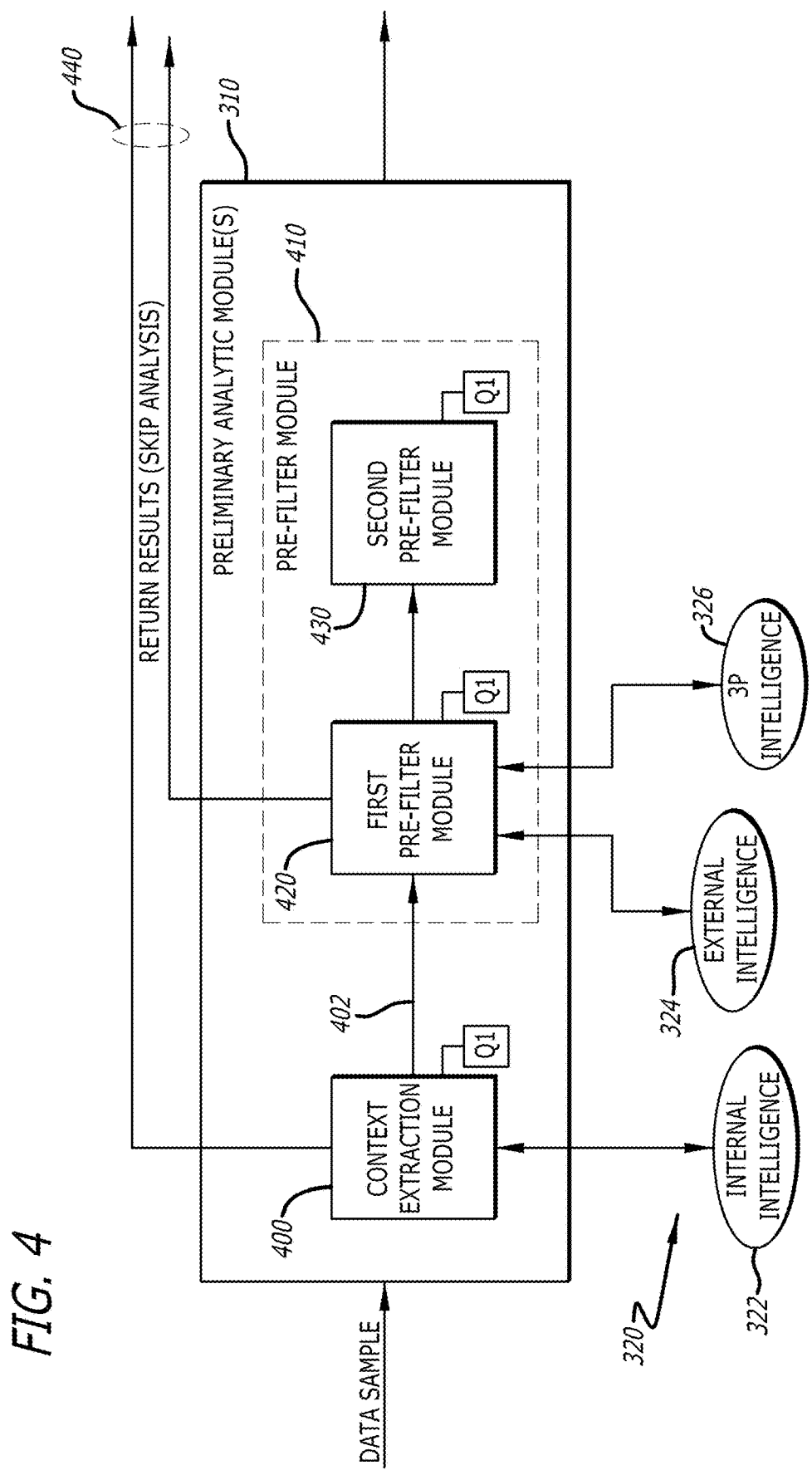
FIG. 4 is a block diagram of an exemplary embodiment of a first evaluation stage of the object evaluation logic of FIG. 2 including a preliminary analytic module.

Referring to FIG. 4, the preliminary analytic module 310 includes a context extraction module 400 and a filtering module 410, which includes a first pre-filter module 420, and a second pre-filter module 430. The context extraction module 400 is configured to recover the context information 146 from the data sample 142 while the filtering module 410 is configured to conduct one or more preliminary analyses of the context information 146 associated with the object 144 and, based on the preliminary analyses, determine an initial classification of the object 144. According to one embodiment of the disclosure, the preliminary analyses of the context information 146 may be conducted on the submission context 147, entitlement context 148, and/or object context 149 in the aggregate.

Upon classifying the object 144 as suspicious, the filtering module 410 passes the object 144 and/or the context information 146 to the analytic engine selection module 340 to conduct additional cyberthreat analytics. Otherwise, responsive to the preliminary malicious (or benign) preliminary classification, the filtering module 410 may bypass further cyberthreat analyses of the object 144 as illustrated by a feed-forward path 440.

More specifically, the first pre-filter module 420 analyzes the context information 146, optionally in accordance with the separate consideration of different context types as described above, by conducting an analysis (e.g., comparison) between at least a portion of the context information 146 and the context information 322 associated with known malicious and/or benign objects gathered from prior analytics conducted by the cybersecurity system 100. The context information 322 may be maintained within one or more virtual data stores as part of the cloud storage resources 154 hosted by the cloud network 110 of FIG. 1B. In the event that the portion of the context information 146 is determined to be associated with a known malicious or benign object, the first pre-filter module 420 may bypass operations by at least the analytic engine selection module 340, the cyberthreat analytic module 350, the correlation module 370 as represented by the feed-forward path 440. Otherwise, the context information 146 is provided to the second pre-filter module 430.

Similarly, the second pre-filter module 430 analyzes the context information 146 by conducting an analysis (e.g., comparison) between at least a portion of the context information 146 and the context information 324 associated with known malicious and/or benign objects gathered from analytics conducted by other cybersecurity intelligence sources and/or context information 326 associated known malicious and/or benign objects accessible from third party cybersecurity source(s). In the event that the portion of context information 146 is determined to be associated with a known malicious or benign object, the second pre-filter module 430 may also bypass operations by at least the analytic engine selection module 340, the cyberthreat analytic module 350, the correlation module 370 (and perhaps the post-processing module 380), as represented by the feed-forward path 440. Otherwise, the object 144 is determined to be suspicious, where the context information 146 and/or the object 144 are made available to the second evaluation stage 391 of the object evaluation logic 270.

More specifically, the context information 146 and/or the object 144 are made available to the analytic engine selection module 340. For example, according to one embodiment of the disclosure, the content associated with the object 144 and/or context information 146 with a first stage queue Q1 may be passed (or made available by identifying its storage location) to a second stage queue Q2 allocated for the second evaluation stage 391.

Referring back to FIG. 3, the analytic engine selection module 340 is configured to determine the type and/or ordering of analytic engines to process the object 144 based on the context information 146, such as the submission context 147, the entitlement context 148 and/or the object context 149 maintained in the second stage queue Q2. The analytic engine selection module 340 may select the analytic engine(s) based on the context information 146. The particular ordering (workflow) of the analytic engines may be based, at least in part, based on the types of context information. For example, the entitlement context 148 may identify certain types of analytic engines that are permitted for use (e.g., allow certain analytic engine types and preclude others, allow all types of analytic engine types) based on the subscription tier. Also, object context may tailor the type of analytic engine to avoid selection of a configuration for an analytic engine that is unsuitable or ineffective for a particular type of object while submission context may tailor those engines with attack vectors oriented to the origin of the object (e.g., email source for analytic engine more targeted for email analysis, etc.).

Figure 5:
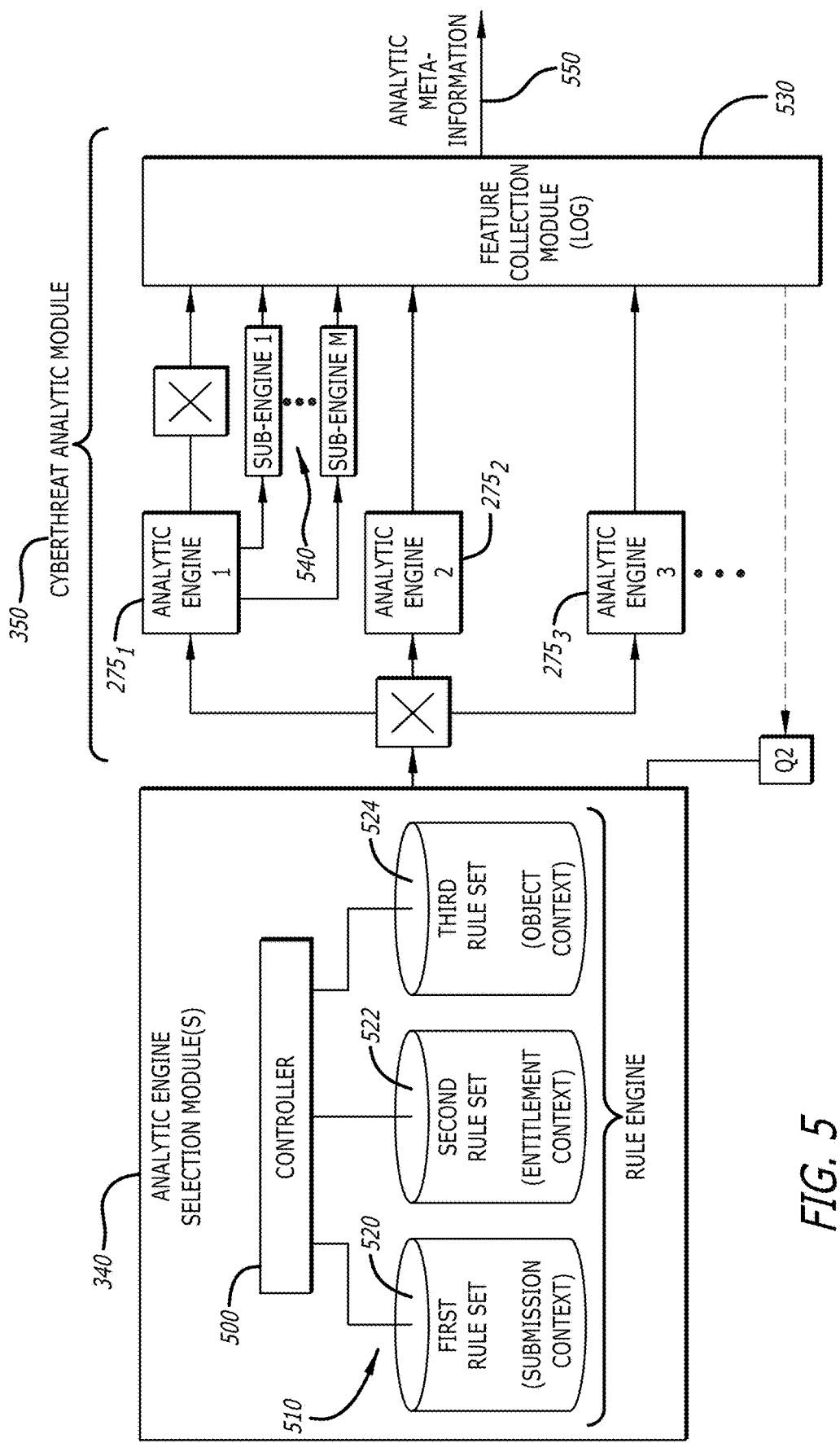
FIG. 5 is a block diagram of an exemplary embodiment of a second evaluation stage of the object evaluation logic including an analytic engine selection module operating with an cyberthreat analytic module deployed within a third evaluation stage of the object evaluation logic of FIG. 2.

Referring now to FIG. 5, a block diagram of an exemplary embodiment of the logical architecture of the analytic engine selection module 340 operating with the cyberthreat analytic module 350 of FIG. 3 is shown. Herein, according to this embodiment, the analytic engine selection module 340 includes a controller 500 and a plurality of rule sets 510, which are identified as a first rule set 520, a second rule set 522 and a third rule set 524. The rule sets 510 may be executed or referenced by the controller 500 in the aggregate analyses of different types of context information 146 in determining the number and types of analytic engines selected for analysis of the object 144. According to one embodiment of the disclosure, the rule sets 510 may be maintained separate from the queue Q2 being part of a distributed queue allocated for the analytic engine selection module 340. Although, in an alternative embodiment, the controller 500 may select the analytic engine(s) based on the context information 146 considered in its totality.

As an alternative embodiment, according to one embodiment of the disclosure, the first rule set 520 may be used by the controller 500 in selecting a first group of analytic engines based on the submission context 147 provided with the data sample 142. Similarly, the second rule set 522 may be used by the controller 500 in selecting a second group of analytic engines based on the entitlement context 148 while the third rule set 524 is used by the controller 500 in selecting a third group of analytic engines based on the object context 149. As the incoming context information 146 includes two or more different content types (e.g., any combination of two or more of submission context 147, entitlement context 148 and object context 149), the analytic engines may be determined to be a subset of analytic engines common to the selected groups of analytic engines.

Upon selecting one or more analytic engines to analyze the data sample 142, the controller 500 may be configured to formulate, from the computing instances, these selected analytic engines to operate sequentially or concurrently. Herein, the selected analytic engines $275_1$-$275_L$ (L≥1, L=3 for embodiment) may include at least one or any combination of the following: (i) static analytic engines to conduct an analysis on the content of the object 144 within the data sample 142 and generate results including observed features represented by characteristics of the object 144 (and accompanying context information); (ii) dynamic analytic engines to conduct an execution of the object 144 and generate results including features represented by observed behaviors of the analytic engine (and accompanying context information); (iii) machine learning analytic engines to conduct extraction of insights using a trained model and generate results including features represented by a probability of the object 144 being malicious (and accompanying context information); and/or (iv) emulation analytic engines to conduct reproduction of operations representing the execution of the object 144 without such execution and generate results including features represented by the emulated behaviors (and accompanying context information).

As further shown in FIG. 3, the distributed queues 155 associated with the cyberthreat analytic module 350 may maintain the portions of the data sample 142 (e.g., object 144, context information 146, etc.) for retrieval by each of the selected analytic engines. Features produced by the analytics conducted by the selected analytic engines $275_1$-$275_3$ are collected by a feature collection module 530 operating, at least in part, as an event (feature) log. The features correspond to resultant information produced by each of the selected analytic engines during analysis of at least a portion of the context information 146 and/or the object 144.

Referring to both FIG. 3 and FIG. 5, as shown, the cyberthreat analytic module 350 includes one or more analytic engines $275_1$-$275_3$, which are selected to perform different analytics on the object 144 in efforts to determine whether the object is malicious (malware present) or non-malicious (no malware detected). These analytic engines $275_1$-$275_3$ may operate sequentially or concurrently (e.g., at least partially overlapping in time). The analytic engines $275_1$-$275_3$, according to one embodiment of the disclosure, may assess the content associated with the object 144 and/or context information 146 within a third stage queue Q3 that is passed from the first stage queue Q2, where the context information 146 may include additional context information produced from the analyses conducted by at first and second evaluation stages 390-391. As described above, the analytic engines $275_1$-$275_L$ may be selected based, at least in part, on the submission context, entitlement context and/or the object context. As a result, the analytic engines $275_1$-$275_3$ may be selected as any one or any combination of at least two of the following analytic engines as described above: (i) static analytic engines; (ii) dynamic analytic engines, (iii) machine learning analytic engines, and/or (iv) emulation analytic engines.

A feedback path 360 represents that the cyberthreat analytic module 350 may need to conduct a reiterative, cascaded analysis of an additional object, uncovered during analysis of another object, with a different selection of engines (hereinafter, "sub-engines" 540). Herein, the analytic engines $275_1$-$275_3$ may be operating concurrently (in parallel), but the sub-engines 540 may be conducted serially after completion of operations by the analytic engine $275_1$. The sub-engine 1 540 may be initiated to perform a sub-analysis based on an event created during processing of the object 144 by the analytic engines $275_1$. The event may constitute detection of an additional object (e.g., an executable or URL embedded in the object 144, such as a document for example, detected during analysis of the object 144) or detected information that warrant analytics different than previously performed. According to one embodiment of the disclosure, this may be accomplished by returning the additional object(s) along with its context information to the second stage queue Q2 associated with the analytic engine selection module 340, for selection of the particular sub-engine(s) 540. The processing of the object 144 and/or context information 146 by the analytic engines $275_2$-$275_3$ may be conducted in parallel with the analytic engines $275_1$ as well as sub-engines 540.

Figure 6:
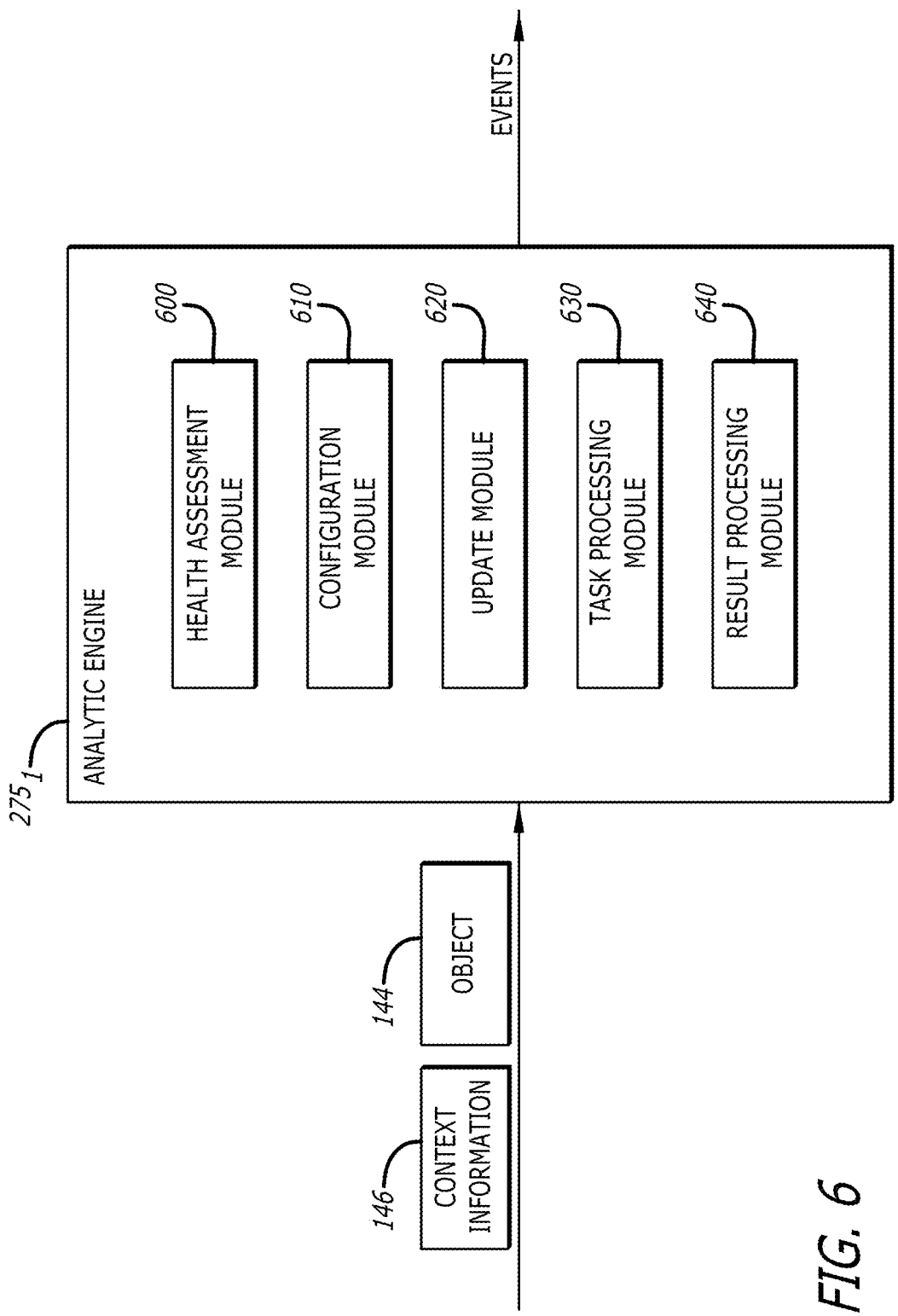
FIG. 6 is a block diagram of an exemplary embodiment of an analytic engine configured to operate as part of the cyberthreat analytic module of FIG. 3.

Referring to FIG. 6, a block diagram of an exemplary embodiment of an analytic engine (e.g., analytic engine $275_1$) configured to operate as part of the cyberthreat analytic module 350 of FIG. 3 is shown. Herein, each analytic engine $275_1$ . . . or $275_L$ is based on an analytic engine infrastructure hosted by the cloud network and provisioned by the analytic engine selection module 340. As shown, each analytic engine $275_1$ . . . or $275_L$, such as the analytic engine $275_1$ for example, include a health assessment module 600, a configuration module 610, an update module 620, a task processing module 630 and a result processing module 640.

Herein, according to one embodiment of the disclosure, the health assessment module 600 is configured to determine the operational health of the analytic engine $275_1$. The operational health may be represented, at least in part, by its utilization level that signifies when the analytic engine $275_1$ is stalled or non-functional (e.g., <5% utilization) or when the analytic engine $275_1$ is at a higher risk than normal of failure (e.g., >90% utilization). The aggregate of the operational health of each of the analytic engine $275_1$-$274_3$ may be accessed and used in determining overall system health by the system health assessment module 255 of FIG. 2.

Referring still to FIG. 6, the configuration module 610 is configured to control the configuration and re-configuration of certain functionality of the analytic engine $275_1$. For example, according to one embodiment of the disclosure, the configuration module 610 may be configured to control reconfiguration and control interoperability between the analytic engine $275_1$ and other modules within the subscription evaluation logic 270 and/or the administrative control logic 220. Additionally, the configuration module 610 may be further configured to set and control the duration of an analysis conducted for the data sample 142. The duration may be uniform for all data samples independent of object type or may be set at different durations based on the type of object included as part of the data sample 142. Additionally, the configuration module 610 may be configured to select (i) the queue (e.g., third stage queue Q3) from which one or more data samples (including data sample 142) awaiting analysis by the analytic engine $275_1$ is retrieved, (ii) different software profiles to install when conducting dynamic analytics on each data sample maintained in the queue, and/or (iii) what time to conduct such analytics on queued data samples.

The update module 620 is configured to receive and control installation of changes to sets of rules controlling operability of the task processing module 630 and the result processing module 640 (described below) and changes to parameters to modify operability of the analytic engine $275_1$.

The task processing module 630 is configured to monitor the queuing infrastructure associated with the third evaluation stage 392 (third stage queue Q3) of the object evaluation logic 270 of FIG. 3. More specifically, the task processing module 630 monitors the third stage queue Q3 for retention of data samples awaiting analysis by the analytic engine $275_1$ to ascertain a current processing level for the cybersecurity system 100 and determine if a capacity threshold for the third stage queue Q3 has been exceeded, perhaps over a prescribed period of time to avoid throttling. If so, the task processing module 630, if set by the configuration module 610, may signal the auto-scaling module 260 within the administrative control logic 220 to activate one or more additional computing stances to be configured and used as additional analytic engines for the object evaluation logic 270. Additionally, the task processing module 630 may be configured to further monitor one or more other stage queues (e.g., first stage queue Q1, second stage queue Q2, fourth stage queue Q4 and/or fifth stage queue Q5) to estimate future processing capacity, upon which the auto-scaling module 260 may commence scaling up or scaling down analytic engines.

Figure 7:
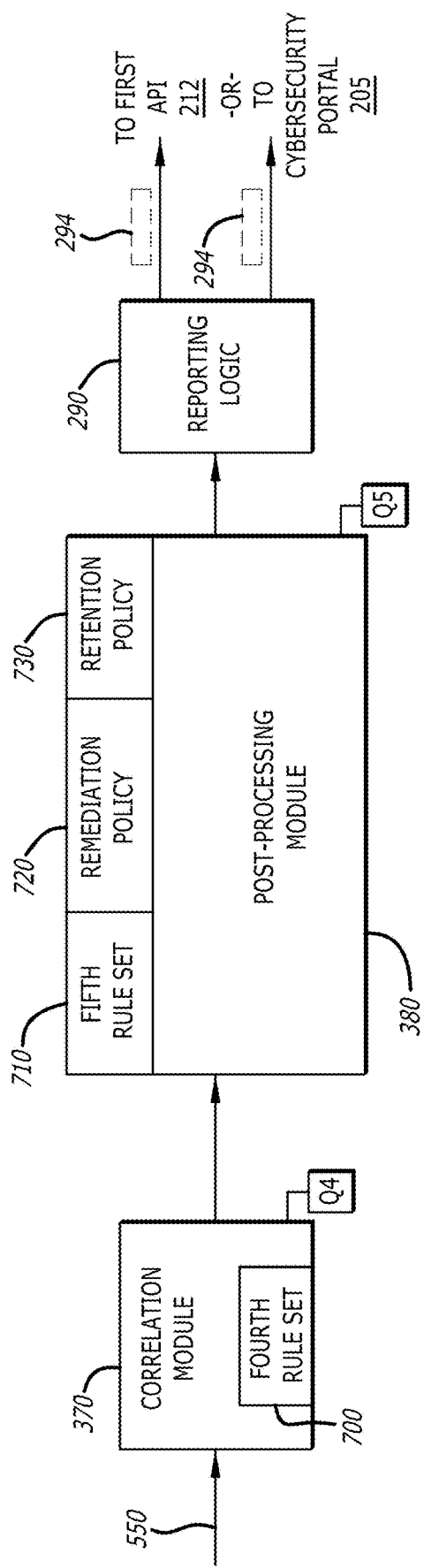
FIG. 7 is a block diagram of an exemplary embodiment of a fourth evaluation stage of the object evaluation logic including a correlation module and a post-processing module deployed within a fifth evaluation stage of the object evaluation logic of FIG. 2.

Referring to both FIG. 3 and FIG. 7, a fourth evaluation stage 393 includes a correlation module 370, which operates in accordance with a fourth rule set 700 to classify the object included as part of the data sample as malicious, benign, unknown or suspicious based on the meta-information (events) collected from the analyses performed by the analytic engines. The classification of the object 144 may be based, at least in part, on meta-information associated with the analytic results generated by the analytic engines $275_1$-$275_3$ and maintained with the event log 530 (hereinafter, "analytic meta-information" 550). The classification of the object (sometimes referred to as the "verdict") is provided to post-processing module 380 that is part of a fifth evaluation stage 394.

Depending on the verdict, the post-processing module 380, operating in compliance with a fifth rule set 710 and deployed within the fifth evaluation stage 394, may initiate actions to remediate, in accordance with a remediation policy 720, a detected cyberthreat represented by the object 144 through blocking, resetting of configuration settings, or performance of a particular retention policy on the object 302 and/or context information 146 associated with the object 144 in accordance with a retention policy 730. For example, the object 144 and/or context information 146, currently maintained in a fifth stage queue Q5, may be stored as part of the internal intelligence 322 accessible by the preliminary analytic module 310 (see FIG. 3), where certain portions of the context information 146 associated with the object 144 classified as "malicious" may be stored for a first prescribed period of time (e.g., ranging from a month to indefinitely) while this context information 146 may be stored for a second prescribed time less than the first prescribed time (e.g., ranging from a few days to a week or more) when the object 144 is classified as "benign".

Based on the results of the cyberthreat analytics and determination by the correlation module 370, the reporting logic 290 controls the reporting of these cyberthreat analytic results, which may include one or more alerts 160 to allow an administrator (e.g., person responsible for managing the customer cloud-hosted resources or the public cloud network itself) access to one or more dashboards via the cybersecurity portal 205 or the first API 212.

The reporting logic 290 is configured to receive the meta-information 292 associated with the analytic results produced by the object evaluation logic 270 and generate the displayable report 294 including the comprehensive results of the cyberthreat analytics (e.g., verdict, observed features and any corresponding context information including meta-information), as described above.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A system for conducting cyberthreat analytics on a submitted object to determine whether the object is malicious, comprising:
 a cloud platform configured to host resources including cloud processing resources and cloud storage resources; and
 a cybersecurity system to analyze one or more received objects included as part of a submission received from a subscriber after authentication of the subscriber and verification that the subscriber is authorized to perform one or more tasks associated with the submission, the cybersecurity system being configured to operate as a multi-tenant Security-as-a-Service (Saas) that relies upon the cloud processing resources and the cloud storage resources provided by the cloud platform in performing cybersecurity operations,
 wherein the cybersecurity system includes (i) one or more analytic engines each configured, when executed, to perform a different analytic on the object of the one or more received objects for determining whether the object is malicious or non-malicious and (ii) a plurality of modules to enhance classification and remediation of the object, the plurality of modules comprise at least (a) a correlation module that, when executed, classifies the object included as part of the submission as malicious, benign, unknown or suspicious based on meta-information collected from analytics performed by the one or more analytic engines, and (b) a post-processing module to receive information associated with the classification of the object from the correlation module and initiate actions to remediate, in accordance with a remediation policy, a detected cyberthreat represented by the classified object.

2. The system of claim 1, wherein the correlation engine is coupled to the one or more analytic engines and is configured to determine whether the object is malicious or non-malicious based on meta-information collected from analyses performed by the one or more analytic engines.

3. The system of claim 1, wherein the post-processing module is configured to remediate the detected cyberthreat represented by the classified object by at least causing a resetting of configuration settings associated the cloud processing resources or the cloud storage resources.

4. The system of claim 1, wherein the post-processing module is configured to perform operations in accordance with a retention policy on the object by the cybersecurity system.

5. The system of claim 4, wherein the post-processing module is configured to change retention time periods for context information associated with benign or malicious objects within cybersecurity intelligence.

6. The system of claim 1, wherein cybersecurity system further comprises reporting logic configured to generate a displayable report including comprehensive results of the cyberthreat analytics conducted by the one or more analytic engines, the correlation module, and the post-processing module.

7. The system of claim 6, wherein reporting logic is configured to receive a subscription identifier being part of the submission to identify a preferred method of conveyance of alerts for the subscriber.

8. The system of claim 6, wherein the reporting logic to cause generation of a displayable report including comprehensive results including the classification of the object determined by the correlation module, meta-information representing the comprehensive results associated with the cyberthreat analytics conducted by the correlation module, and context information associated with the cyberthreat analytics conducted by the correlation module.

9. A cybersecurity system for conducting cyberthreat analytics on a submitted object from a subscriber after authentication of the subscriber and verification that the subscriber is authorized to perform one or more tasks associated with the submission including at least determining whether the object is malicious, comprising:
   one or more analytic engines each configured, when executed by a processor, to perform a different analytic on an object included as part of the submission for determining whether the object is malicious or non-malicious; and
   a plurality of modules to enhance classification and remediation of the object, the plurality of modules comprise at least
      a correlation module configured, when executed by the processor, to classify the object included as part of the submission as malicious, benign, unknown, or suspicious based on meta-information collected from analytics performed by the one or more analytic engines, and
      a post-processing module, when executed by the processor, is configured to receive information associated with the classification of the object from the correlation module and initiate actions to remediate, in accordance with a remediation policy, a detected cyberthreat represented by the classified object,
   wherein the cybersecurity system being configured to operate as a multi-tenant Security-as-a-Service (SaaS) that relies upon cloud processing resources and cloud storage resources provided by a cloud platform in performing cybersecurity operations.

10. The cybersecurity system of claim 9, wherein the post-processing module is configured to remediate the detected cyberthreat represented by the classified object by at least causing a resetting of configuration settings associated the cloud processing resources or the cloud storage resources.

11. The cybersecurity system of claim 9, wherein the post-processing module is configured to perform operations in accordance with a retention policy on the object by the cybersecurity system by at least changing retention time periods for context information associated with benign or malicious objects within cybersecurity intelligence.

12. The cybersecurity system of claim 9 further comprising:
   reporting logic configured, when executed by the processor, to generate a displayable report including comprehensive results of the cyberthreat analytics conducted by the one or more analytic engines, the correlation module, and the post-processing module.

13. The cybersecurity system of claim 12, wherein reporting logic is configured to receive a subscription identifier being part of the submission to identify a preferred method of conveyance of alerts for the subscriber providing the submission.

14. A non-transitory storage medium including software that, upon execution, functions as a cybersecurity system by at least conducting cyberthreat analytics on a submitted object from a subscriber after authentication of the subscriber and verification that the subscriber is authorized to perform one or more tasks associated with the submission including at least determining whether the object is malicious, the non-transitory storage medium comprising:
   one or more analytic engines each configured to perform a different analytic on an object included as part of a submission for determining whether the object is malicious or non-malicious; and
   a plurality of modules to enhance classification and remediation of the object, the plurality of modules comprise at least
      a correlation module configured to classify the object included as part of the submission as malicious, benign, unknown, or suspicious based on meta-information collected from analytics performed by the one or more analytic engines, and
      a post-processing module is configured to receive information associated with the classification of the object from the correlation module and initiate actions to remediate, in accordance with a remediation policy, a detected cyberthreat represented by the classified object,
   wherein the software functioning as the cybersecurity system is configured to operate as a multi-tenant Security-as-a-Service (SaaS) that relies upon cloud processing resources and cloud storage resources provided by a cloud platform in performing cybersecurity operations.

15. The non-transitory storage medium of claim 14, wherein the post-processing module is configured to perform operations in accordance with a retention policy on the object by the cybersecurity system by at least changing retention time periods for context information associated with benign or malicious objects within cybersecurity intelligence.

16. The non-transitory storage medium of claim 14, wherein the software further comprising:
   reporting logic configured to generate a displayable report including comprehensive results of the cyberthreat analytics conducted by the one or more analytic engines, the correlation module, and the post-processing module.

17. The non-transitory storage medium of claim 16, wherein the reporting logic is configured to receive a subscription identifier being part of the submission to identify a preferred method of conveyance of alerts for the subscriber providing the submission.

* * * * *